United States Patent
Ensing

(10) Patent No.: US 10,484,818 B1
(45) Date of Patent: Nov. 19, 2019

(54) SYSTEMS AND METHODS FOR PROVIDING LOCATION INFORMATION ABOUT REGISTERED USER BASED ON FACIAL RECOGNITION

(71) Applicant: Maris Jacob Ensing, Orange, CA (US)

(72) Inventor: Maris Jacob Ensing, Orange, CA (US)

(*) Notice: Subject to any disclaimer, the term of this patent is extended or adjusted under 35 U.S.C. 154(b) by 0 days.

(21) Appl. No.: 16/142,435

(22) Filed: Sep. 26, 2018

(51) Int. Cl.
*H04W 4/021* (2018.01)
*H04W 4/029* (2018.01)
(Continued)

(52) U.S. Cl.
CPC ........ *H04W 4/021* (2013.01); *G06K 9/00288* (2013.01); *H04N 7/181* (2013.01); *H04W 4/029* (2018.02)

(58) Field of Classification Search
CPC .... G06Q 50/01; G06Q 10/10; G06Q 30/0261; G06Q 10/02; G06Q 30/02; G06Q 30/0601; G06Q 10/00; G06Q 30/0207; G06Q 20/0453; G06Q 20/3278; G06Q 20/40145; G06Q 30/0258; G06Q 30/0259; G06Q 30/0267; G06Q 20/4014; G06Q 20/32; G06Q 50/22; G06Q 50/265; G06Q 30/0643; G06Q 20/3823; G06Q 20/3227; G06Q 20/363; G06Q 30/0631; G06Q 50/24; G06Q 10/1097; G06Q 20/3276; G06Q 20/34; G06Q 20/367; G06Q 20/3674; G06Q 20/382; G06Q 20/40; G06Q 50/12; H04L 51/32; H04L 67/306; H04L 67/18; H04L 67/02; H04L 51/38; H04L 51/20; H04L 63/0861; H04L 63/107; H04L 43/08; H04L 43/04; H04L 65/1059; H04L 2209/608; H04L 43/16; H04L 63/102; H04L 63/10; H04L 63/0892; H04L 63/08; H04L 63/12; H04L 2209/80; H04L 63/108; H04L 9/32; H04L 9/3231; H04L 41/0806; H04L 67/303; H04L 63/1416; Y02D 70/1262; Y02D 70/142; Y02D 70/144; Y02D 70/146; Y02D 70/164; Y02D 70/22; Y02D 70/1242; Y02D 70/1222; Y02D 10/24; Y02D 70/166; Y02D 70/26; Y02D 70/23; H04W 4/21; H04W 4/02; H04W 4/023; H04W 4/029; H04W 4/021;
(Continued)

(56) References Cited

U.S. PATENT DOCUMENTS 6,072,894 A * 6/2000 Payne ................ G07C 9/00158
 235/375
6,549,118 B1 * 4/2003 Seal .................... G06K 9/00597
 340/5.52

(Continued)

OTHER PUBLICATIONS

Non-Final Office Action on co-pending U.S. Appl. No. 16/036,625 dated Apr. 5, 2019.

*Primary Examiner* — Nimesh Patel
(74) *Attorney, Agent, or Firm* — Klein, O'Neill & Singh, LLP

(57) ABSTRACT

Systems and methods for providing location information for registered users in a venue. A facial recognition process is used to identify each registered user, and associate each identified registered user with a location of the image from which the identification was made. The location information may then be provided when an authorized user requests the location information for a particular registered user.

21 Claims, 19 Drawing Sheets

(51) Int. Cl.
*H04N 7/18* (2006.01)
*G06K 9/00* (2006.01)

(58) Field of Classification Search
CPC . H04W 52/0254; H04W 4/027; H04W 12/06; H04W 64/00; H04W 52/0258; H04W 12/08; H04W 4/025; H04W 52/0225; H04W 52/0251; H04W 4/90; H04W 52/18; H04W 4/23; H04W 4/80; H04W 88/02; H04W 12/12; H04W 8/16; G06F 16/29; G06F 3/0482; G06F 2221/2111; G06F 2201/805; G06F 21/32; G06F 21/316; G06F 21/602; G06F 21/6245; G06F 19/3418; G06F 19/30; G06F 19/325; G06F 1/163; G06F 2203/011; G06F 3/005; G06F 3/013; G06F 3/017; G06F 3/04815; G06F 21/88; G06F 21/31; G06F 21/554; G06F 2221/2149; G06F 21/50; G06F 17/2765; G06F 21/60; G06K 9/00288; G06K 9/00677; G06K 9/00711; G06K 9/00228; G06K 9/00013; G06K 9/00221; G06K 9/00335; G06K 9/00369; G06K 9/00771; G06K 19/10; G06K 2209/01; G06K 9/00302; G06K 9/00362; G06K 9/00664; G06K 9/00671; G06K 9/00892; G06K 9/00778; G06K 9/4642; G06K 9/00785; G08B 13/196; G08B 13/19689; G08B 25/10; G08B 7/068; G08B 13/126; G08B 13/19613; G08B 13/1966; G08B 25/005; G08B 25/08; G08B 13/1963; G08B 21/10; G08B 13/00; G08B 13/1961; G08B 13/19641; G08B 13/19697; G08B 25/006; G08B 25/14; H04M 1/72536; H04M 2201/50; H04M 2242/04; H04M 1/66; H04M 2250/14; H04M 11/007; H04M 2250/52; A61B 5/0022; A61B 5/746; A61B 2503/06; A61B 5/002; A61B 5/02438; A61B 5/1118; A61B 5/747; G01S 2205/006; G01S 2205/008; G01S 5/0009; G01S 5/0018; G01S 5/0054; G01S 19/17; G01S 5/0231; H04N 7/181; H04N 7/188; H04N 21/21805; H04N 21/2187; H04N 21/8153; H04N 5/2259; H04N 5/23206; H04N 5/23212
See application file for complete search history.

(56) References Cited

U.S. PATENT DOCUMENTS

| | | | |
|---|---|---|---|
| 8,504,843 | B2 | 8/2013 | Tu |
| 8,589,968 | B2 | 11/2013 | Alberth et al. |
| 8,700,451 | B2 | 4/2014 | Jayakody |
| 8,712,110 | B2 | 4/2014 | Eckhoff et al. |
| 8,725,567 | B2 | 5/2014 | Huang et al. |
| 8,791,787 | B2 | 7/2014 | Hardacker et al. |
| 8,965,170 | B1 | 2/2015 | Benea et al. |
| 9,363,155 | B1 | 6/2016 | Gravino et al. |
| 9,575,558 | B2 | 2/2017 | Almen et al. |
| 9,767,346 | B2 | 9/2017 | Govindara et al. |
| 9,875,719 | B2 | 1/2018 | Eckhoff et al. |
| 10,123,066 | B2 | 11/2018 | Zhang et al. |
| 10,165,333 | B2 | 12/2018 | Patel et al. |
| 2005/0225637 | A1* | 10/2005 | Eghbalian .......... G08B 13/1961 348/155 |
| 2007/0024580 | A1 | 2/2007 | Sands et al. |
| 2008/0004951 | A1 | 1/2008 | Huang et al. |
| 2010/0071003 | A1 | 3/2010 | Bychkov et al. |
| 2010/0177193 | A1* | 7/2010 | Flores .................. G08B 13/126 348/148 |
| 2011/0052012 | A1 | 3/2011 | Bambha et al. |
| 2011/0072452 | A1 | 3/2011 | Shimy et al. |
| 2012/0174143 | A1 | 7/2012 | Yang et al. |
| 2013/0061258 | A1 | 3/2013 | Takaya et al. |
| 2013/0194406 | A1 | 8/2013 | Liu et al. |
| 2015/0150031 | A1 | 5/2015 | Gibbon et al. |
| 2015/0160035 | A1* | 6/2015 | Longo ..................... H04W 4/02 701/423 |
| 2015/0319506 | A1 | 11/2015 | Kansara et al. |
| 2016/0110591 | A1* | 4/2016 | Smith ................ G06K 9/00302 382/103 |
| 2016/0343237 | A1* | 11/2016 | Herman ............... G08B 25/008 |
| 2017/0171613 | A1 | 6/2017 | Xu et al. |
| 2017/0214728 | A1 | 7/2017 | Chan et al. |
| 2017/0295215 | A1 | 10/2017 | Syed |
| 2017/0289596 | A1 | 11/2017 | Krasadakis et al. |
| 2017/0352256 | A1* | 12/2017 | Miwa ..................... G08B 25/04 |
| 2018/0091854 | A1 | 3/2018 | Greenberger et al. |
| 2018/0108040 | A1 | 4/2018 | Kim et al. |
| 2018/0211187 | A1 | 7/2018 | Chen et al. |
| 2018/0357667 | A1 | 12/2018 | Hall et al. |
| 2018/0357981 | A1 | 12/2018 | Ng et al. |
| 2019/0034710 | A1* | 1/2019 | Dickinson .............. H04N 7/181 |

* cited by examiner

| Identifier | 1400 |
|---|---|
| Image | 1405 |
| Age | 1410 |
| Group | 1415 |
| Subgroups | 1420 |
| Access permissions | 1425 |
| Restrictions | 1430 |
| Special needs | 1435 |
| List of exhibits | 1440 |
| List of images | 1445 |
| List of consumables | 1450 |
| List of locations | 1455 |

Figure 14

| Location | 1500 |
|---|---|
| Crowd size information | 1505 |
| List of interested users | 1510 |

Figure 15

SYSTEMS AND METHODS FOR PROVIDING LOCATION INFORMATION ABOUT REGISTERED USER BASED ON FACIAL RECOGNITION

CROSS-REFERENCE TO RELATED APPLICATIONS

Not Applicable

FEDERALLY FUNDED RESEARCH OR DEVELOPMENT

Not Applicable

BACKGROUND

The present disclosure relates to computing technology generally for venues with multiple exhibits and/or attractions and venues including sports stadiums; and more particularly, to providing facial recognition technology based location information about users at the venues.

There are many types of venues such as, for example, museums, galleries, theme parks, audience centers, sports stadiums, and zoos that may display exhibits for audiences from the general public. It is a problem for groups of people that attend a venue to keep track of the activities and location of others in the group. One proposed solution to this problem is to track a user using Radio Frequency Identification (RFID). However, this type of system requires that the user carry or wear an RFID tag. This is often an annoyance for the user and hence, undesirable. Furthermore, the RFID may be removed, discarded, and/or lost.

Thus, those skilled in the art are constantly striving to develop computing and networking technology for systems and methods that can track and provide reliable location information in a venue for groups of users with minimal inconvenience.

SUMMARY

The above and other problems are solved and an advance in the art is made by systems and methods for providing location information of registered users in a venue using facial recognition technology. In accordance with some aspects of the invention the system includes image capture devices that are each aimed at a different location in a venue and capture an image of the location. The system includes one or more processors that perform at least the following process.

The process receives images from the image capture devices. Each of the images is of a different location and is captured by one of the image capture devices. Image processing, such as facial recognition, is performed on each of the images to determine each registered user identified in each of the captured images. Each registered user identified in each of the captured images is associated with the location of the image in which the registered user is identified. The process stores the location in each of the identified users in the location information of a data record maintained for each of the identified users. A request may be received for location information of a particular user and the location information in the data record of the particular user is provided to satisfy the request.

In some other aspects of the invention, a method for providing location information for registered users at a venue may be performed in the following manner. Images from multiple image capture devices are received. Each of the images is of a different location and is captured by a different image capture device. Image processing, such as facial recognition, is performed on each of the images to determine each registered user identified in each location associated with each captured image. Each registered user that is identified and the location in of each of the identified registered users is stored in location information of a data record maintained for each of the identified registered users. A request for location information of a particular user is received and the location information in the data record of the particular user is provided to satisfy the request.

BRIEF DESCRIPTION OF THE DRAWINGS

FIG. 14 is a conceptual diagram of a data record for a registered user stored by the central control system in accordance with an aspect of the disclosure.

FIG. 15 is a conceptual diagram of a data record for a location in the venue stored by the central control system in accordance with an aspect of the disclosure.

DETAILED DESCRIPTION

Figure 1:
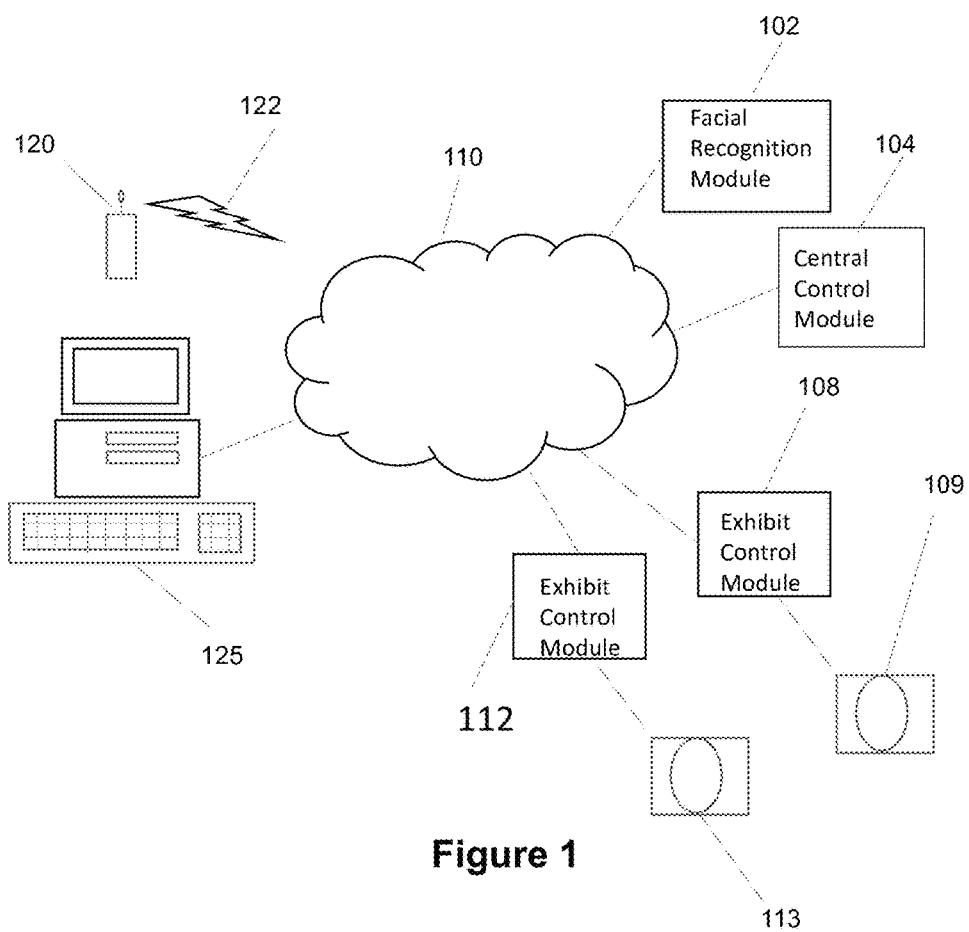
FIG. 1 is a diagrammatic representation of systems and devices that perform processes for providing location information for groups of users in a venue in accordance with one aspect of the invention.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Systems and methods in accordance with various aspects of this disclosure capture and provide location information of registered users in a venue based upon facial recognition performed on images captured in various locations in the venue.

A user location system in accordance with this disclosure advantageously includes an exhibit control system, module, or functionality; a central control system, module, or functionality; and a facial recognition system, module, or functionality. The exhibit control function may advantageously be provided by a computer system that is connected to an image capture device (e.g., a camera) focused on an area near the exhibit. The computer system controls the camera to capture images of the area, and provides the image to the central control system, module, or functionality. The central control function may be performed by a computer system, and a database that stores registered user information. The central control system or module receives the image from the exhibit control system or module and provides the image to the facial recognition system or module. The facial recognition system or module identifies registered users in the images and associates the location captured in the image with each identified user. Although the use of facial recognition is described throughout this disclosure, other image processing techniques that identify particular colors, shapes, or other visual identifiers worn and/or carried by registered users may alternatively be used to identify registered users and are within the contemplation of this disclosure. The central control system or module then receives user location information from the facial recognition module and stores the location of the identified users in a user location list maintained for the user. The facial recognition system or module receives the images of the locations from the central control system or module, analyzes the image, and returns user location information to the central control system or module.

A registered user in the group may use a computing device at a kiosk or some other location in the venue; and/or application executed by a personal device of the registered user to request information for other registered users in a group. The central control system retrieves the location information each registered user associated group and provides it the requesting user via the user device or provided computer that was used to send the request. In accordance with other various aspects the central control system may also provide directions to find and/or meet other group members; and/or provide other venue information relevant to the registered user including, but not limited to, exhibit wait times and/or exhibit availability.

FIG. 1 illustrates a system 100 for providing media content to supplement an exhibit in accordance with an aspect of the disclosure. The system 100 includes a facial recognition module 102; a central control module 104; and exhibit control modules 108 and 112 that are communicatively connected by a network 110. A portable personal communication device 120 and a computer 125 may also be connected to the network 110. Although shown as four separate devices or functionalities in FIG. 1, the facial recognition module 102; the central control module 104; and the exhibit control module 108 and 112 may be provided by a single computing system. Alternatively, the processes that provide one or more of the facial recognition module 102, the central control module 104, and the exhibit control module 108 may be distributed across multiple systems that are communicatively connected via the network 110.

The facial recognition module, functionality, or system 102 may be implemented or functionalized by a computer system that includes a memory and a processing unit to perform the processes for providing facial recognition and/or or other image analysis. The computer system that implements the facial recognition module, functionality, or system may include one or more servers, routers, computer systems, and/or memory systems that are communicatively connected via a network to provide facial recognition and/or other image analysis.

The central control module 104 may be implemented or functionalized by a computer system that includes a memory and a processing unit to perform processes for storing and providing media content for one or more exhibits in a venue. The central control module 104 may also advantageously store and update location information of a user. The central control functionality may be provided by a central control system for the venue. Specifically, the central control module 104 may be implemented or functionalized by a system that includes one or more servers, routers, computer systems, and/or memory systems that are communicatively connected via a network to store and provide media content for one or more exhibits in the venue, as well as to store and update location information for registered users.

Each of the exhibit control modules 108 and 112 may be implemented or functionalized by a computer system that controls devices in the exhibit area that include an image capture device. Advantageously, one computer system may control devices for more than one exhibit. In specific embodiments, the exhibit control modules 108 and 112 may be implemented or functionalized by a system that includes one or more servers, routers, computer systems, memory systems, an image capture device and/or media playback devices that are communicatively connected via a local network to obtain and present media content for the exhibit.

The network 110 may advantageously be the Internet. Alternatively, the network 110 may be a Wide Area Network (WAN), a Local Area Network (LAN), or any combination of Internet, WAN, and LAN that can be used communicatively to connect the various devices and/or modules shown in FIG. 1.

The portable personal communication device 120 may a smart phone, tablet, Personal Digital Assistant (PDA), a laptop computer, or any other device that is connectable to the network 110 via wireless connection 122. The computer 125 may advantageously connect to the network 110 via either a conventional "wired" or a wireless connection. The computer 125 may be, for example, a desktop computer, a laptop, a smart television, and/or any other device that connects to the network 110. The portable personal communication device 120 and/or the computer 125 allow a user to interact with one or more of the above-described modules to provide information such as, for example, personal information to be added to registered user information of the user.

Although a particular system of devices and/or functional modules is described above with respect to FIG. 1, other system architectures that, add, remove, and/or combine various devices and/or modules may be used to perform various processes in accordance with various other aspects of the disclosure.

Figure 2:
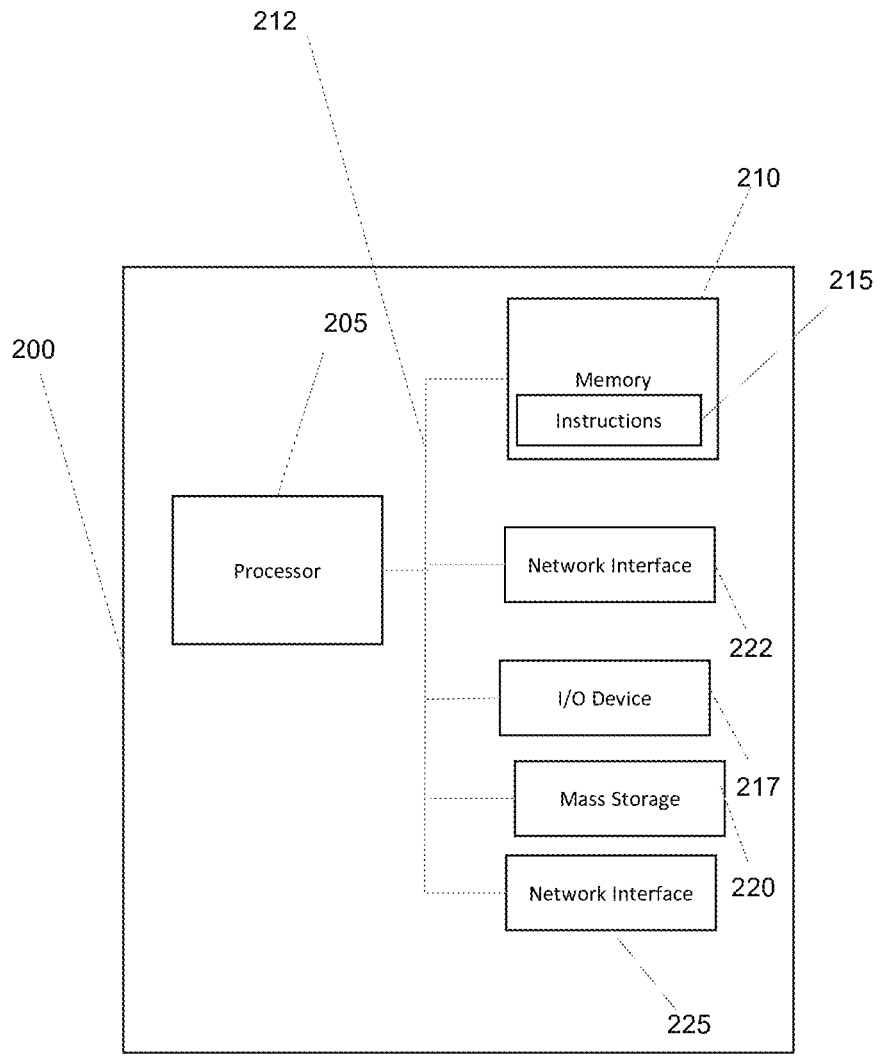
FIG. 2 is a block diagram of a computer processing system in a component in accordance with an aspect of the disclosure.

FIG. 2 is a high-level block diagram showing an example of the architecture of a processing system 200 that may be used according to some aspects of the disclosure. The processing system 200 can represent a computer system that provides a facial recognition functionality, a central control functionality, an exhibit control functionality, and/or other components or functionalities. Certain standard and well-known components of a processing system which are not germane to the subject matter of this disclosure are not shown in FIG. 2.

Processing system 200 includes one or more processors 205 in operative communication with memory 210 and coupled to a bus system 212. The bus system 212, as shown in FIG. 2, is a schematic representation of any one or more separate physical buses and/or point-to-point connections, connected by appropriate bridges, adapters and/or controllers. The bus system 212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The one or more processors 205 are the central processing units (CPUs) of the processing system 200 and, thus, control its overall operation. In certain aspects, the one or more processors 205 accomplish this by executing software stored in memory 210. The processor(s) 205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 210 represents any form of random access memory (RAM), read-only memory (ROM), flash memory, or the like, or a combination of such devices. Memory 210 includes the main memory of the processing system 200. Instructions 215 implementing the process steps of described below may reside in memory 210 and are executed by the processor(s) 205 from memory 210.

Also advantageously connected operatively to the processor(s) 205 through the bus system 212 are one or more internal or external mass storage devices 220, and a network interface 222. The mass storage device(s) 220 may be, or may include, any conventional medium for storing large volumes of data in a non-volatile manner, such as one or more solid state, magnetic, or optical based disks. The network interface 222 provides the processing system 200 with the ability to communicate with remote devices (e.g., storage servers) over a network, and may be, for example, an Ethernet adapter, a Fiber Channel adapter, or the like.

The processing system 200 also advantageously includes one or more input/output (I/O) devices 217 operatively coupled to the bus system 212. The I/O devices 217 may include, for example, a display device, a keyboard, a mouse, etc.

Figure 3:
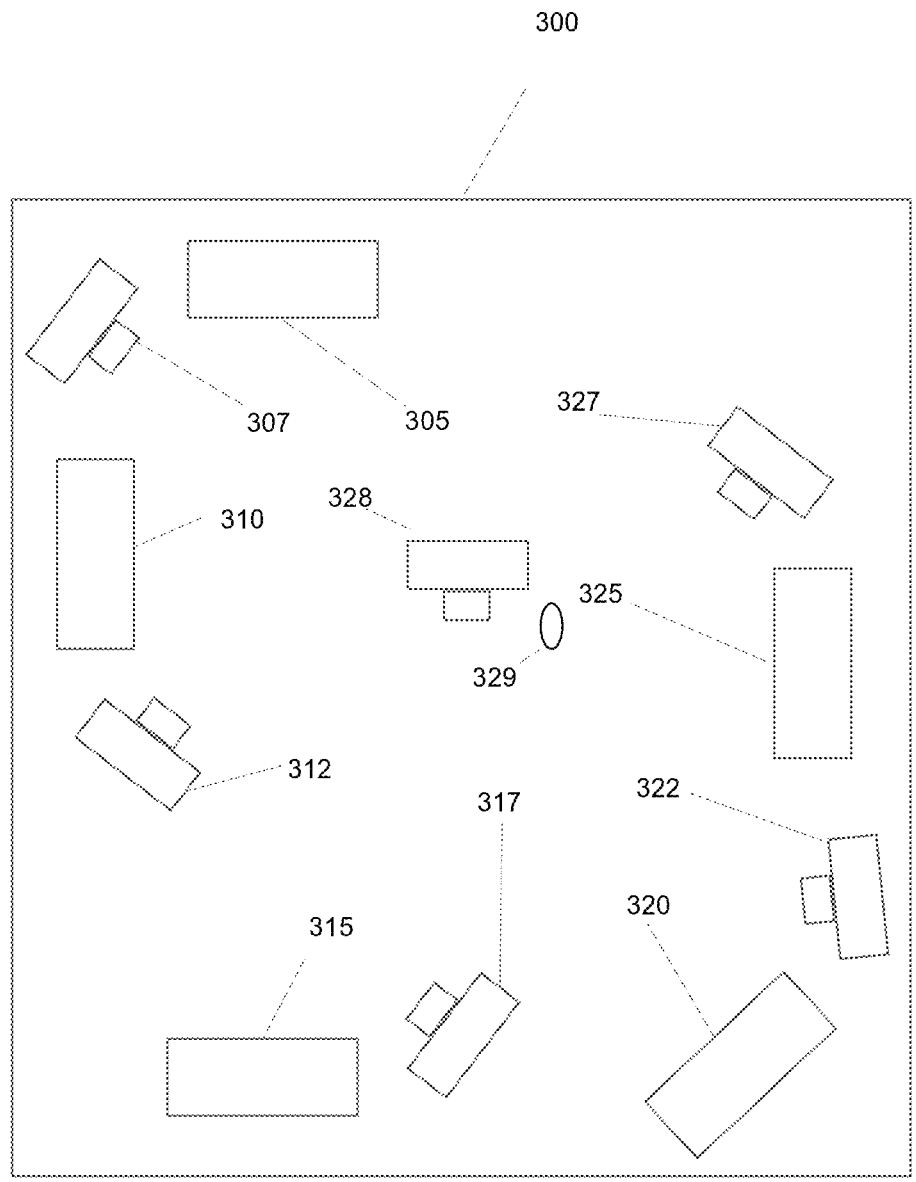
FIG. 3 is conceptual perspective view of a venue and placement of image capture devices at various exhibits in a venue in accordance with an aspect of the disclosure.

FIG. 3 illustrates a venue with multiple exhibits or attractions in accordance with an aspect of the invention. As shown in FIG. 3, a venue 300 includes multiple exhibits or attractions including exhibits 305,310, 315, 320, and 325. Each exhibit has an associated image capture device 307, 312, 317, 322, and 327 respectively.

For example, exhibit 305 has an associated image capture device 307 that is focused on an area in front of exhibit 305 to capture an image with facial images of patrons entering the exhibit 305. Preferably, the image capture device is focused on an area near an entrance and/or exit of the exhibit to ensure capturing images with the greatest number of facial images of patrons. Furthermore, although one associated image capture device is shown with each exhibit, an exhibit can have more than one associated image capture devices in accordance with various aspects of this disclosure. Furthermore, image capture devices, such as image capture device 328, may be placed in various locations around the venue 100, such as but not limited to, high traffic areas to capture location information of patron in the location and/or as many patrons as possible.

In accordance with some aspects, a proximity sensor 329 may be associated with an image capture device 328 to detect when one or more patrons are in a location. The proximity sensor may send a signal to the image capture 328 when one or more patrons are detected. The image capture device then captures an image of the location for use in location determination of registered users as will be discussed in more detail below.

Although an exemplary venue in accordance with an aspect of the invention is described above with reference to FIG. 3, other configurations that add, remove, combine, and/or move components relative to one another are possible.

Figure 4:
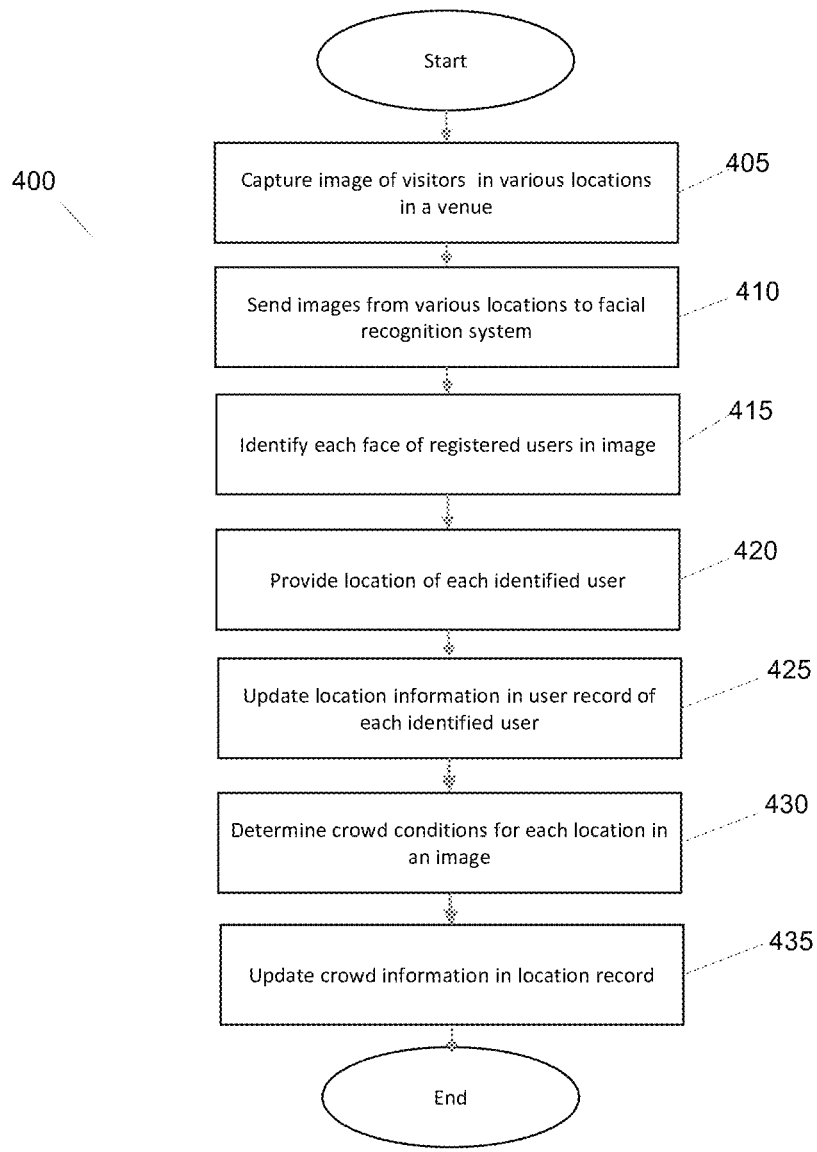
FIG. 4 is a flow diagram of a process for providing location information about users at various locations in a venue in accordance with an aspect of the disclosure.

FIG. 4 illustrates a flow diagram of a process for providing location information about users at various locations in a venue in accordance with an aspect of the disclosure. The registration process for users is described below in detail with respect to FIG. 16. The process 400 captures images of patrons in various known locations throughout the venue (405) using a plurality of image capture devices (307, 312, 317, 322, 327, 328 (FIG. 3). For example, a location may be, but is not limited to, an entrance or an exit of an exhibit; an entrance or exit of the venue; and/or other high traffic locations in the venue. The captured images are advantageously provided to a facial recognition device or module (e.g. 102 FIG. 1) (410). The facial recognition device or module identifies the desired portions of each captured image that include the facial image of one or more patrons (415).

A facial recognition process is then performed on the identified portion of each captured image to identify (e.g., with appropriate user information) each registered user in each image and associate each identified user with the location where the image was captured (420). The location of each identified user is then updated in a location record (shown in FIG. 13) for the user (425). Crowd conditions in a location including, but not limited to, crowd size for an exhibit, may also be determined from the image of each location (430). The crowd information for each location is then updated in a location record (shown in FIG. 14) (435) after which the process 400 ends.

The above describes an overall process for obtaining location information registered users and/or crowd information for a location in a venue in accordance with one aspect of the disclosure. However, other processes that add, combine, remove, and/or reorder the steps of the process are possible.

Figure 5:
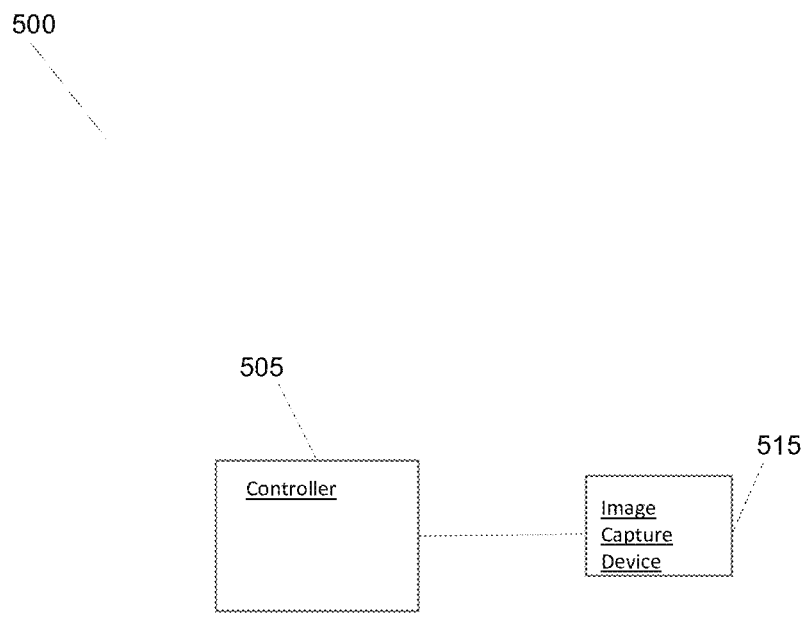
FIG. 5 is a block diagram of components of an exhibit control system in accordance with an aspect of the disclosure.

As discussed above, an exhibit control system, device, or module (e.g. 108, 112, FIG. 1) captures the images of the patrons in near an exhibit/high traffic area. In some embodiments, the exhibit control system, device, or module may be a separate system that is not associated with a specific exhibit. Instead, the image capture device (e.g. 328, FIG. 3) is a high traffic location and associated with a location control system and/or associated exhibit control system, to send information to the central control device or module (e.g. 104, FIG. 1). FIG. 5 is a block diagram of the components of an exhibit control system, device or module 500 and/or location control system (similar to 108, 112, FIG. 1) which, in accordance with an aspect of the disclosure, includes a controller 505 and an image capture device 515 (similar to 328, FIG. 3).

The controller 505 may be implemented as a processing system that controls the image capture device 515 in capturing images of an area and/or location to obtain the location information for registered users using image analysis of the captured image. In accordance with some aspects, the controller 505 may also control one or more components of the exhibit. These components may include, for example, valves, hydraulic lifts, animatronics that provide motion in the exhibit, and any other components that receive instructions to perform a task to facilitate the presentation of the exhibit. In some other aspects, the control system for more than one exhibit may be provided by a processing system.

The image capture device 515 may be a camera that captures still images and/or a video camera that captures video images. In the exemplary embodiment shown in FIG. 5, the image capture device 515 is a separate device including a processing system that is communicatively connected to the controller 505 via a wireless or wired connection. In some other aspects, the image capture device 515 is an I/O device of the processing system or module including the controller 505. As discussed above, the image capture device 515 is positioned such that the device is focused on a particular area near the exhibit in a manner to capture images that include facial images of patrons in the area. The image capture device 515 may also capture, record, or otherwise provide other information, such as depth information for the imaged image objects.

Although an exemplary embodiment of an exhibit control device or module is described above with respect to FIG. 5, other embodiments that add, combine, rearrange, and/or remove components are possible.

Figure 6:
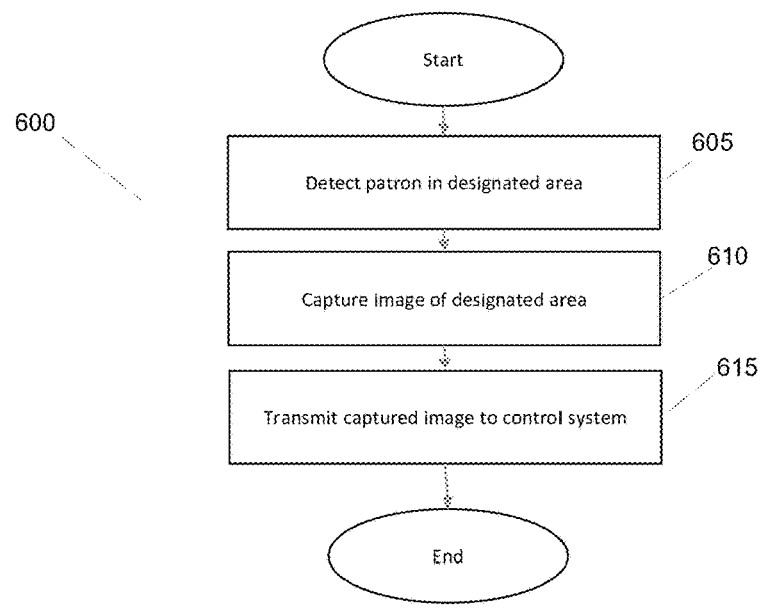
FIG. 6 is a flow diagram of a process performed by the exhibit control system to capture an image of registered users in an exhibit area in accordance with an aspect of this disclosure.

FIG. 6 illustrates a flow diagram of a process 600 performed by the exhibit control device or module (500 or 108/112) to capture images to provide location information for registered users in accordance with an aspect of this disclosure. In the process 600, a patron is detected in an area (605) by, for example, the facial recognition system, motion sensors, heat sensors, and/or any other type of sensor that may detect the presence of one or more patrons in the audience area.

An image is captured of the area (610), for example, in response to the detection of one or more patrons in the designated area by image capture device 515. Alternatively, the image capture device may periodically capture an image at pre-defined intervals of time, or a video feed of the designated area may be continuously captured and one or more images may then be extracted from the video feed when one or more patrons are detected in the designated area.

The captured image is transmitted to a central control device or module (e.g. 104, FIG. 1) (615), optionally with other information about the image. Such other image information may include, for example, camera settings, depth information, lighting information, and/or other like information related to the image. The image information may be transmitted separately, or it may be transmitted in or with the captured image. Optionally, a video feed may be provided to the central control device or module. The exhibit control device or module may optionally monitor a video feed and only send an image that includes patrons taken from a feed when a patron is detected in the area. The exhibit control device or module may optionally perform image processing to improve image quality prior to transmitting the image, and/or it may optionally isolate facial images from the captured image and send only portions of the image that include facial images to the central control device or module. Process 600 may then end.

Although an exemplary process performed by the exhibit control device or module to obtain location information for registered users in accordance with aspects of this disclosure is discussed above with respect to FIG. 6, other processes performed by the exhibit control device or module to provide the media content that add to, combine, rearrange, or remove any of the described steps are possible and are considered within the scope of this disclosure.

In accordance with some aspects of this disclosure, the system may also store records of consumable products that a registered user purchases and/or is awarded. For purposes of this discussion, consumable products are any item that may be awarded to or purchased by a registered user in the venue. Examples include, but are not limited to, toys, gift certificates, souvenirs, or any other item that a user may obtain in the venue. The user may then go to a redemption center at a later time and obtain the consumable products that the user had purchased/received earlier. Preferably, the redemption center would be near the exit of the venue to allow the user to collect the obtained consumable products just prior to leaving the venue.

Figure 7:
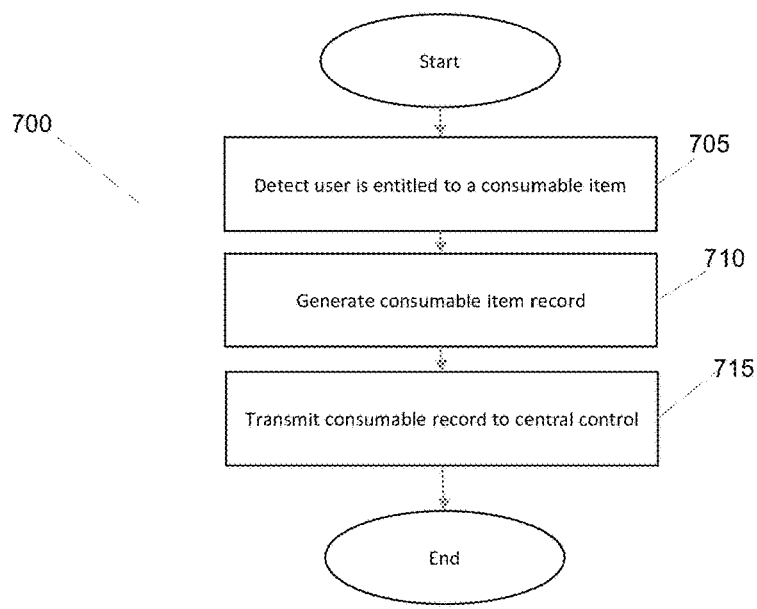
FIG. 7 is a flow diagram of a process performed by the exhibit control system to capture provide consumable information about registered users in accordance with an aspect of this disclosure.

FIG. 7 illustrates a flow diagram of a process performed by an exhibit control module or device (e.g 108, FIG. 1) to send information about a consumable product obtained by a registered user at the exhibit. The process 700 begins by detecting the user is entitled to a consumable product (705). This detection may be a purchase of a consumable product or an awarding of the consumable product as a prize in a game and/or contest.

The process then generates a record for the consumable product that indicates the consumable product contained and the registered user that obtained the item (710). The record of the consumable product is then transmitted to the central control system (715) and the process 700 ends.

Although an exemplary process performed by the exhibit control device or module to provide records of consumable products obtained by users in accordance with aspects of this disclosure is discussed above with respect to FIG. 7, other processes performed by the exhibit control device or module to provide the media content that add to, combine, rearrange, or remove any of the described steps are possible and are considered within the scope of this disclosure.

Figure 8:
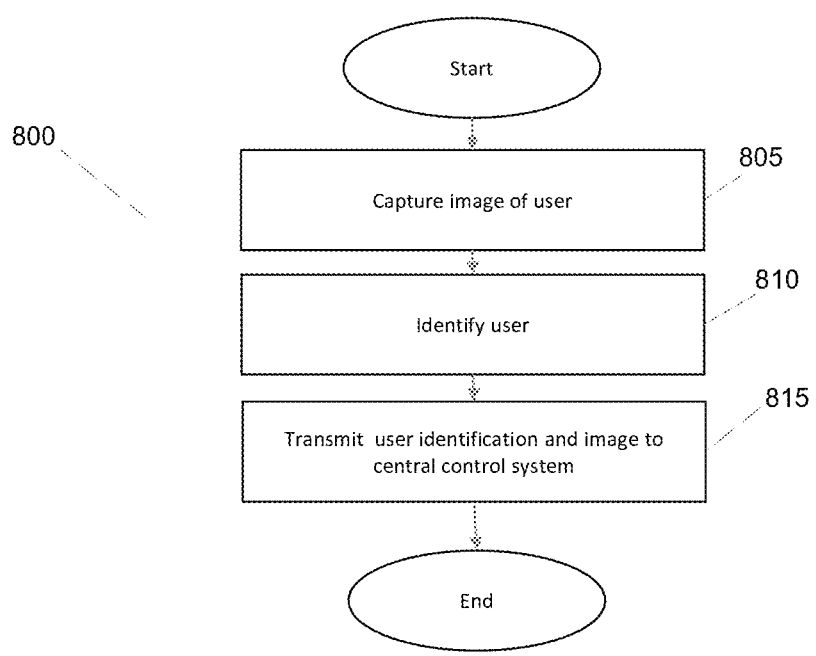
FIG. 8 is a flow diagram of a process performed by an exhibit control system to associate an image captured at a photo opportunity are with a registered user in accordance with an aspect of the invention.

Similar to the consumable products discussed above, some exhibits and/or areas may have areas available for photo opportunities and have venue employees and/or professional photographers at the photo opportunity area to capture an image of a registered users and/or a group of users. In accordance with some aspects of the invention, the system provides a system for storing the images captured at various photo opportunity areas and making the images available to the registered user or a user authorized to act for the register user for retrieval and/or purchase. FIG. 8 illustrates a flow diagram of a process performed by an exhibit control system, device, or module (e.g. 108, FIG. 1); and/or location control system, device, or module to provide images of a captured user to the central control system, device, or module (104, FIG. 1) for retrieval by the user in accordance with an aspect of the invention.

The process 800 begins by capturing an image of a registered user at a photo opportunity area associated with the exhibit/area (805). This image is usually captured with an image capture device that is separate and/or different from the image capture device(s) used for location determination.

The process then identifies each registered user associated with the captured image (810). The identification may be performed by reading a bar and/or bar code on a card carried by the user in accordance with some aspects. In accordance with some other aspects, the identification may be performed using the facial recognition system, device, or module (e.g. 102, FIG. 1). The image and identifiers (FIG. 13) associated with each identified registered user in the image are transmitted to the central control system (815). In accordance with some embodiments, the identifiers of the identified registered users may be embedded in the metadata of the image. In accordance with some other embodiments, an image record that includes the image and the identifiers may be generated and transmitted. The process 800 may then end.

A process performed by an exhibit control system, device or module to provide images of registered users captured in an photo opportunity area in accordance with an aspect of the invention is described above with reference to FIG. 8, other processes performed by the exhibit control system, device, or module to provide the media content that add to, combine, rearrange, or remove any of the described steps are possible and are considered within the scope of this disclosure.

Figure 9:
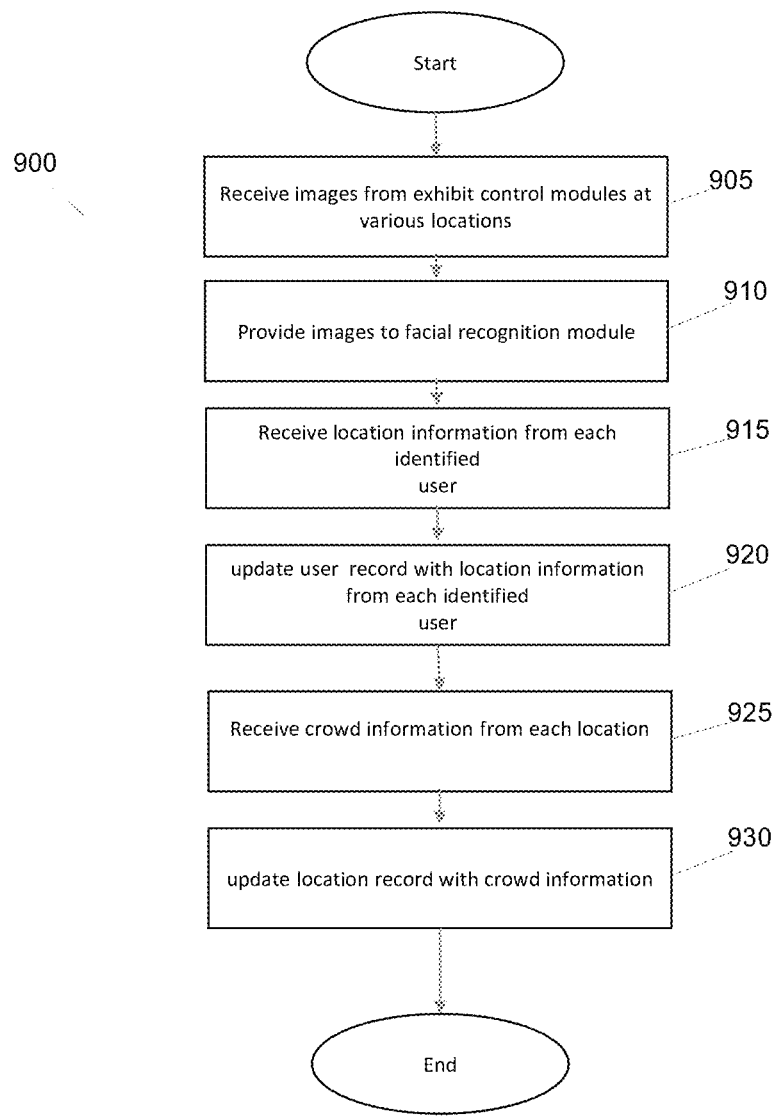
FIG. 9 is a flow diagram of a process performed a central control system to maintain and provide location information for registered users and crowd information for locations including exhibits in accordance with an aspect of this invention.

FIG. 9 illustrates a flow diagram of a process performed by the central control device or module (e.g. 104, FIG. 1) to obtain and store location information for registered users; and/or obtain and store crowd information for exhibits and/or locations, based upon captured images from various locations throughout a venue. A process 900 may be performed for all of the images received. Thus, the process 900 may be performed once to determine the current locations of registered users, or, alternatively, the process 900 may be periodically performed on images from all of the locations to constantly update the location information for the registered users.

In the process 900, captured images of various locations in the venue are received from an exhibit control device or module (e.g., 108, FIG. 1) (905). As discussed above, additional image information may optionally be received with the image. The images are then provided to a facial recognition device or module (e.g. 102, FIG. 1) for image analysis. The central control device or module may perform some image processing prior to providing the images to the facial recognition device or module. The analysis may include, for example, isolating facial images in each of the images, modifying the images to improve image quality, and/or analyzing the images to determine or obtain other image information. In some embodiments, such other image information may be provided by the captured image to the facial recognition system. The received images from the various locations are provided to the facial recognition module or system. As will explained in more detail below, the facial recognition system identifies users in each image and associates a location of the image with each identified user to provide location information for each of the identified registered users. Furthermore, the location information may include a time stamp indicated the time at which the image of a registered user is detected at a location.

The process 900 receives location information and identifiers for the registered users identified in the captured images (915). The central control system (e.g. 104, FIG. 1) updates the location information in the record of each identified registered user based on the received location information (920).

The process 900 may also receive crowd information (see FIG. 14) for each location/exhibit from the facial recognition system (925) and update the crowd information in the location record maintained for each location (930). Process 900 may then end.

Although an exemplary process performed by the central control device or module to obtain and maintain location information for registered users and/or crowd information for locations in accordance with aspects of this disclosure is discussed above with respect to FIG. 9, other processes performed by the central control device or module to provide the media content that add to, combine, rearrange, or remove any of the described steps are possible and are considered within the scope of this disclosure.

Figure 10:
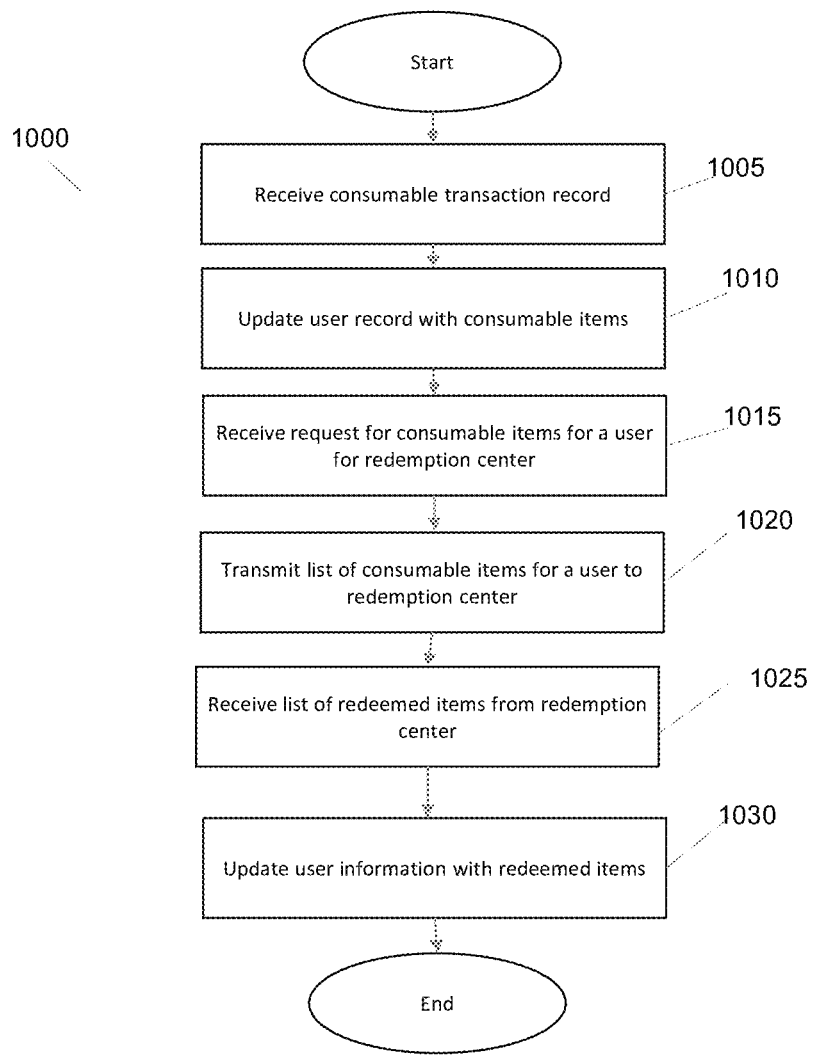
FIG. 10 is a flow diagram of a process performed a central control system to maintain and provide identifications of consumable products available to registered users in accordance with an aspect of this invention.

FIG. 10 illustrates a flow diagram of a process performed by a central control module or system (e.g. 104, FIG. 1) to maintain a list of consumable products obtained by a registered user. The process 1000 begins with the central control module or system receiving a consumable transaction record from an exhibit control system of module (108, 112, FIG. 1) (1005). The transaction record includes an identifier of the consumable product and an identifier of the registered user entitled to the product. In some instances, the transaction record may include other information such a transaction information may show a purchase prices and/or payment, an expiration date/time, or other information related to the product.

The consumable products information in the record of the identified registered user is updated to include the consumable product (1010). At a later time, the central control system may receive a request for the list of consumable products that have been obtained by the registered user from a redemption center system (not shown) (1015). The redemption center system may include one or more computing devices for enabling the process blocks described herein with respect FIG. 10 or otherwise. In some embodiments, a user having the authorization to obtain products for one or more other users (such as the children of the user or other group members) may obtain the list of consumable products available to each user for which the registered user has authorization to obtain their products. The central control system transmits the list of consumable products from the user record of the registered user to the redemption center system in response to the request (1020). The redemption center system then provides the listed consumable products to the user. The redemption center system then adds each consumable product received by the registered user to a redeemed items list and transmits the list to the central control system (1025). The central control system then updates the consumable products list in the user record of the registered user to reflect the products redeemed (1030) and the process 1000 may end.

Although an exemplary process performed by the central control device or module to maintain consumable product information for registered users in accordance with aspects of this disclosure is discussed above with respect to FIG. 10, other processes performed by the central control device or module to provide the media content that add to, combine, rearrange, or remove any of the described steps are possible and are considered within the scope of this disclosure.

Figure 11:
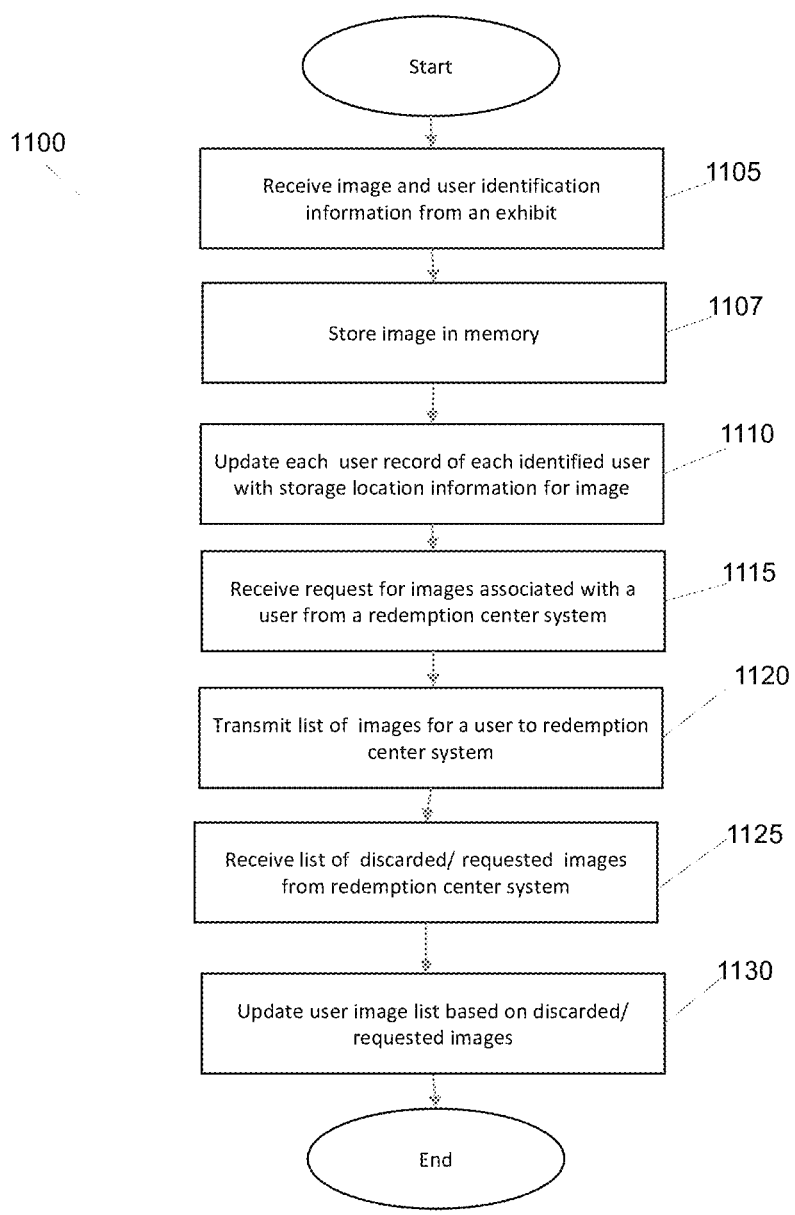
FIG. 11 is a flow diagram of a process performed by a central control system to obtain and maintain captured images for photo opportunity areas associated with registered users in accordance with an embodiment of the invention.

In accordance with some aspects of this invention, the central control system, device, or module stores images from photo opportunity areas and associates the images with registered users. The central control system, device, or module then may provide the images to a redemption device for selection, deletion, and/or purchase of the images by the registered user. A process performed by the central control system, device, or module (e.g. 104, FIG. 1) for storing the images, associating with registered users, and providing the images to a redemption device in accordance with an aspect of this disclosure is shown in FIG. 11.

In process 1100, an image and identifiers associated with registered users in the image are received from an exhibit/location system, module, or device (1105). The image is then stored at a memory location accessible to a processor (1107). In accordance with some embodiments, the image is stored in an image database, data structure using structured or unstructured objects or library maintained by central control system, device, or module as described below with respect to FIG. 13. The user record of each registered user identified in the image is then updated to indicate storage information for the image to associate the image with the registered user (1110).

At a later time, the central control system may receive a request for the list of images that have been associated with a registered user from a redemption device (1115). In some embodiments, a user having the authorization to obtain/view images associated with one or more other users (such as the children of the user or other group members) may obtain the list of images associated each user for which the registered user has authorization to view/obtain their images. The central control system transmits the list of images from the user record(s) of the registered user(s) to the redemption device in response to the request (1120). The redemption device then provides the listed images to the requesting user. This may include the redemption device downloading the images from the image database and/or requesting the images from the central control system. The redemption device then adds each image received, purchased, or uploaded by the registered user to a saved image list and transmits the saved list to the central control system; and/or adds each deleted/discarded image to a discarded image list. The saved image list and/or discarded image list are received by the central control system (1125). The central control system may then update the associated images in the user record of the registered user and/or images stored in memory to reflect each of the received lists (1130) and the process 1100 may end.

Although an exemplary process performed by the central control device or module to store and provide images from photo opportunity areas for registered users in accordance with aspects of this disclosure is discussed above with respect to FIG. 11, other processes performed by the central control device or module to provide the media content that add to, combine, rearrange, or remove any of the described steps are possible and are considered within the scope of this disclosure.

Figure 12:
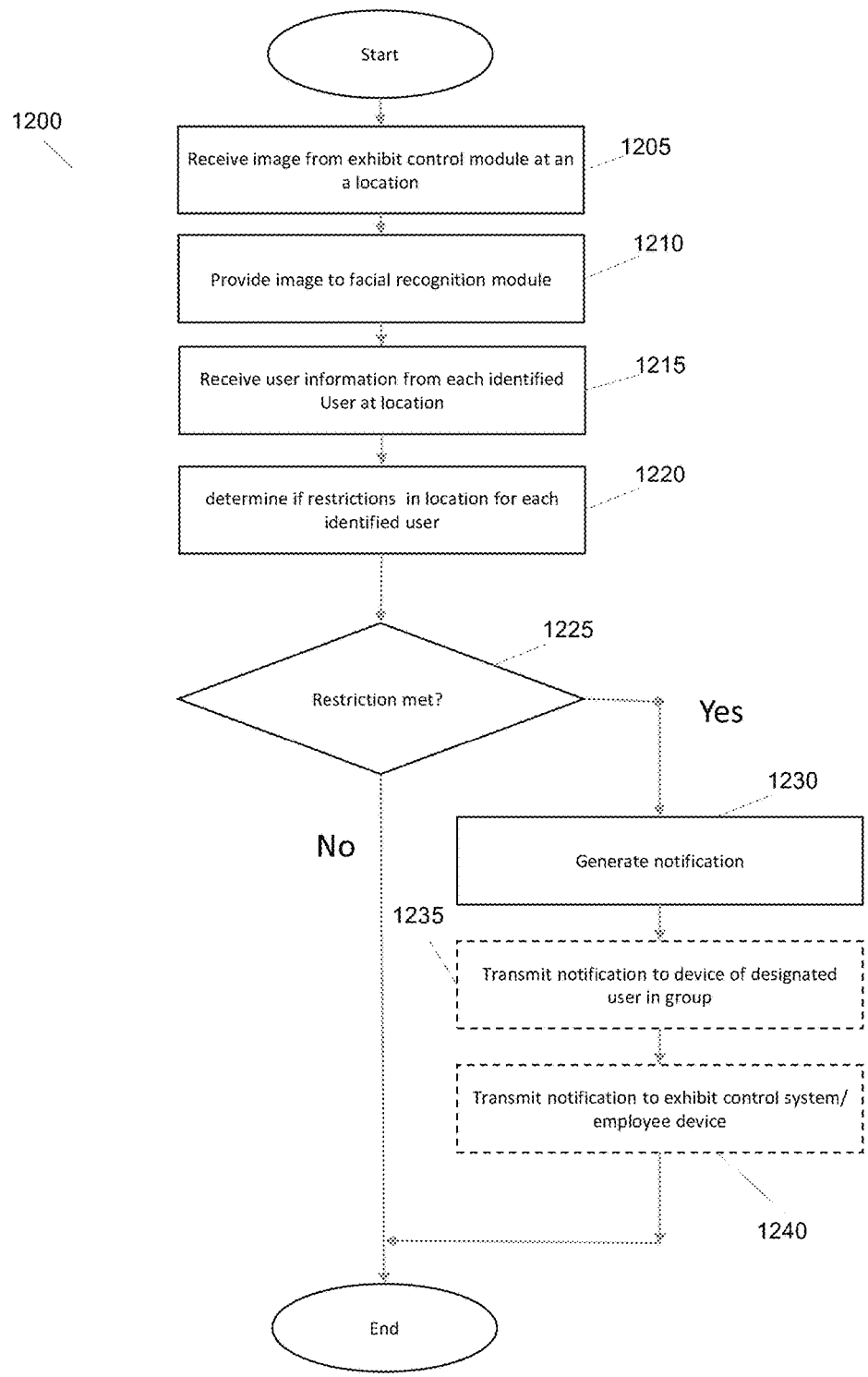
FIG. 12 is a flow diagram of a process performed by the central control system to determine whether registered users meet required criteria for an area in the venue in accordance with an aspect of the disclosure.

A registered user may have certain restrictions regarding the exhibits or locations that the user may visit. For example, some parents may not want their children to view and/or ride certain exhibits as the material in the exhibit or ride may not be age appropriate for their children. Also, the venue may want to assure children exit the venue with the appropriate guardian such as a teacher or parent or that the parent or other adult does not leave a minor unattended in all or a portion of the venue. Thus, systems and processes in accordance with some of these aspects of the invention may want to monitor the location of a registered users and determine whether any restrictions and/or access privileges are met when a registered user is determined to be at a certain exhibit and/or other location. FIG. 12 illustrates of a process performed by the central control system to monitor an area in accordance with an aspect of this disclosure to determine whether a register user is permitted in the area based on restrictions and/or access privileges.

Process 1200, shown in FIG. 12, receives an image captured from an exhibit control module or system (e.g. 108, 112, FIG. 1) associated with a particular exhibit or location (1205). The image is provided by the central control system or module (e.g. 104, FIG. 1) to a facial recognition system or module (e.g. 102, FIG. 1) (1210). The central control system receives location information for each user identified in the image (1215). The central control system or module then determines whether the each of the identified users has any restrictions and/or access privileges for the particular exhibit and/or location (1220). For example, a parent may be restricted from leaving without a minor and/or a minor may be restricted from leaving without an authorized adult. In a second example, an exhibit may be popular and users are restricted to access the exhibit at a certain time. In some cases, the user may have an access privileges, such as a right to enter a premium exhibit and/or ride. If there are restrictions and/or access privileges for identified registered user for the particular exhibit location, a check is made to determine the restrictions/access privileges are met (1225). As a second example, the central control system may determine if an authorized adult is with an identified minor and/or if a parent is with their minor at an exit or at an exhibit with material that may not be age appropriate for the minor. If the restrictions/access privileges are met, process 1200 may end. If the restrictions/access privileges are not met, a notification identifying the restriction or privilege is generated (1030). In some aspects, this may cause a warning such as an alarm, buzzer, or some other device to be activated to notify venue personnel of the restriction/access. In some aspects, the notification is sent to a device of the user and/or a designated party in the group and/or subgroup of the registered user (1235). In some other aspects, the notification is transmitted to one or more devices of venue personnel at the exhibit/location to allow the personnel to handle the situation. Process 1200 may then end.

Although an exemplary process performed by the central control device or module to monitor restrictions and/or privileges at an exhibit/location in accordance with aspects of this disclosure is discussed above with respect to FIG. 12, other processes performed by the central control device or module to provide the media content that add to, combine, rearrange, or remove any of the described steps are possible and are considered within the scope of this disclosure.

Figure 13:
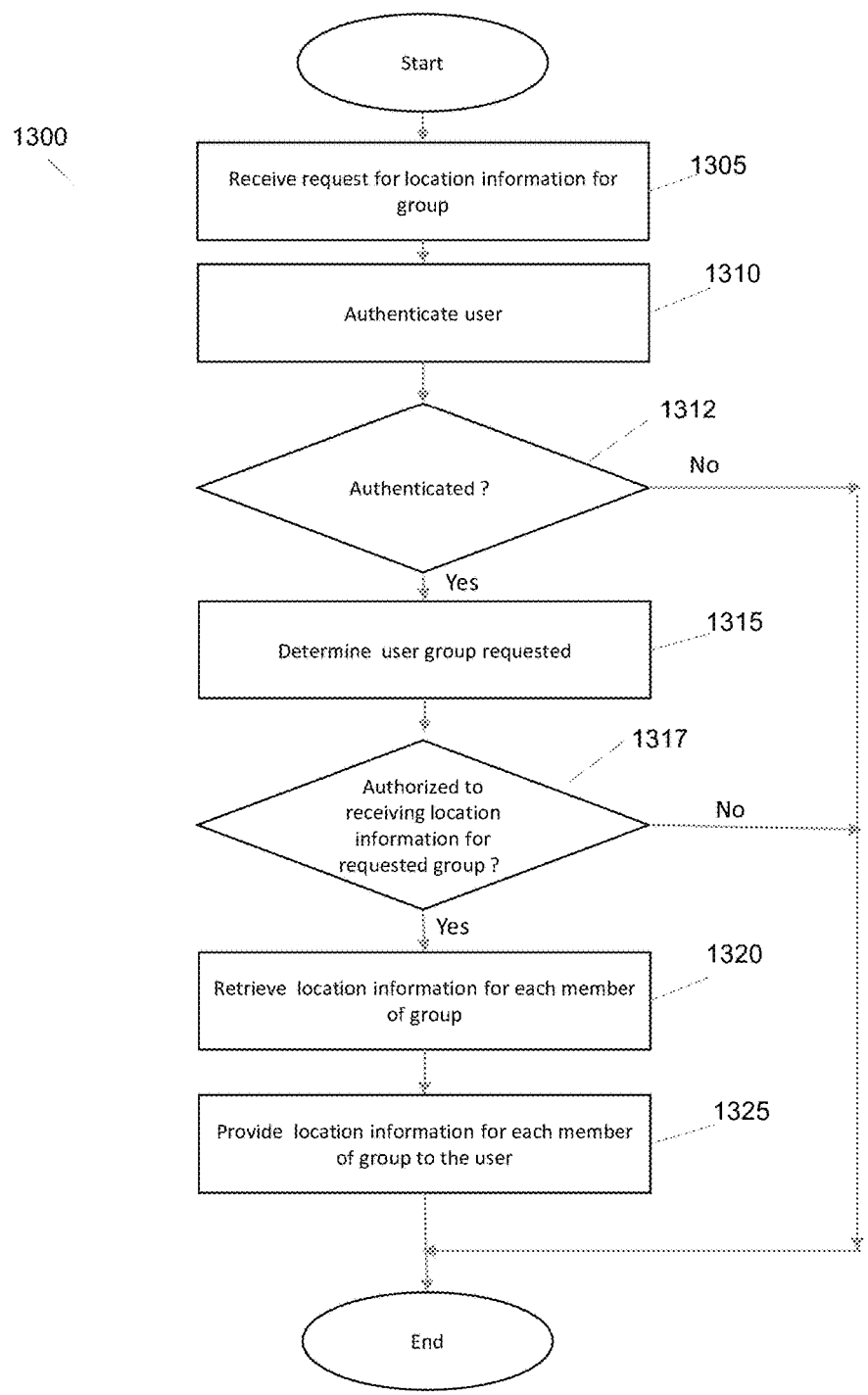
FIG. 13 is a flow diagram of a process performed by the central control system to provide location information of registered users in a group to a group member in accordance with an aspect of the disclosure.

In accordance with some aspects of this disclosure, the central control system may provide information about the locations of registered users in a group to other registered users in the group. Furthermore, users in groups may be further divided into subgroups with only certain group member having access privileges for location information for the groups and/or particular subgroups. The location information for members in a group/subgroup may be conveyed to an application being executed on a personal device of a registered user or a device at a kiosk in the venue that has a computer system for providing the location information. FIG. 13 illustrates a flow diagram of a process performed by the central control system or module (e.g. 104, FIG. 1) to provide location information of a group of registered users in accordance with an aspect of the disclosure.

In process 1300, a request for location information for registered users associated with a specific group is received (1305). The user requesting the information is authenticated (1310). Authentication may be performed using a password, biometric readings, or in some other manner. If the authentication fails (1312), process 1300 ends and location information is not provided. If the requesting user is authenticated, The registered users in the requested group/subgroup are then determined (1315), the determination may be a list of members maintained for each registered group and may be performed by reading the group and/or subgroup field in the registered user record of each user in the group maintained by the central control system or module. A determination is made whether the requesting user is authorized to obtain the location information (1317). This may be performed by reading the access permissions stored in the registered user record of the requesting user. In other embodiments, the permission may be stored in a group data record maintained by the central control system, device, or module for the requested group and/or subgroup. If the requesting user does not have authorization to receive the information, the process 1300 ends. If the requesting user is authorized, the central control system, device or module retrieves the location information for each registered user in the group and/or subgroup from the user records maintained by the central control system, device, or module (1320). In some embodiments, the location information for each registered user only includes information about the last determined location of the user. In accordance with some other embodiments, the location information may include information about 2 or more last locations where the registered user was detected. In still some other embodiments, the entire history of locations of each registered user in the group is provided. In some further aspects, directions to get to the current location of a particular user or group of users may be provided. The location information for each of the registered users in the group is provided to the requesting device (1325) and process 1300 may end.

Although an exemplary process performed by the central control device or provide location information for a user or group of users in accordance with aspects of this disclosure is discussed above with respect to FIG. 13, other processes performed by the central control device or module to provide the media content that add to, combine, rearrange, or remove any of the described steps are possible and are considered within the scope of this disclosure.

FIG. 14 illustrates an example of a registered user record maintained by the central control device or module in accordance with an aspect of this disclosure. The register record 1400 advantageously includes an identifier 1405, such as a name or member number for the registered user. The record 1400 also includes a facial image 1410 of the registered user, either provided to the central control device or module, or captured from the registered user during a registration process. The record 1400 also includes a group field 1425 that identifies a group that is associated with the registered user. In addition, one or more subgroup fields 1430 may be provided. Alternatively, the subgroup field may be a pointer to or a linked list that includes all of the subgroups to which the user belongs.

Record 1400 may also include access permission field 1435 and restrictions field 1440. An access permission field or data structure 1435 stores codes indicating all of the access privileges of the user. The access privileges may indicate the exhibits to which the user has access, the rights to access location information of other users or groups, and/or quality of service indicators such as Very Important Person (VIP) privileges that the user may have in the venue. Restrictions field or data structure 1440 is a list, pointer to a list, or other data structures that includes all of the restrictions that apply to a user. The restrictions may include, but are not limited to, restrictions on exiting the venue, restrictions on access or access time to an exhibit, prohibited areas of the venue and the like.

Other fields for particular information about the registered user may be included. For example, the fields in the record 1400 may advantageously include a field for the user's age 1415, a link to a list of user locations 1465, a link to a list of consumable products 1460, list of images associated with the user 1455, list of desired exhibits to visit 1450 and any special needs of the registered user 1445. The list of special needs may include a list of requirements such as language, subtitles, special access and the like that user may require during a visit to exhibits in the venue.

Although an example of a registered user data record is described above with reference to FIG. 14, other data records that add, remove, and/or combine fields are considered part of the disclosure.

In accordance with some aspects of the disclosure the central control system, device, or module may provide crowd information for particular exhibits and/or other areas of a venue. For example, the system may indicate to a registered user when a desired exhibits is either crowded with long wait time or not crowded with short wait times. In some embodiments, the system may even suggest an ordering of the exhibits and/or areas to visit to ensure that a registered user can visit all of the exhibits and/or areas desired by the user in an amount of time allocated by the user. To do so, the central control system (104, FIG. 1) may maintain a location database that stores crowd information for each location and/or exhibit in the venue. A location record in accordance with an aspect of the disclosure is shown in FIG. 15.

Location record 1500 includes a location identifier field 1505, crowd information field 1510, and interested user field 1515. The location identifier field 1505 is a field that stores a name or some other alpha numeric identifier of the location/exhibit. The crowd information field 1510 is a lost or pointer to a list that stores, among other pieces of information, the size of the crowd at certain times as determined from the captured images of the location/exhibit. The interested user field 1515 is a list, pointer to list or some other data structures that stores identifiers of registered users interested in visiting the particular location/exhibit.

Although a location record maintained for a location/exhibit by the central control system in accordance with an aspect of the disclosure is discussed above with reference to FIG. 15, location records that add, remove, or combine fields are considered part of this disclosure.

Figure 16:
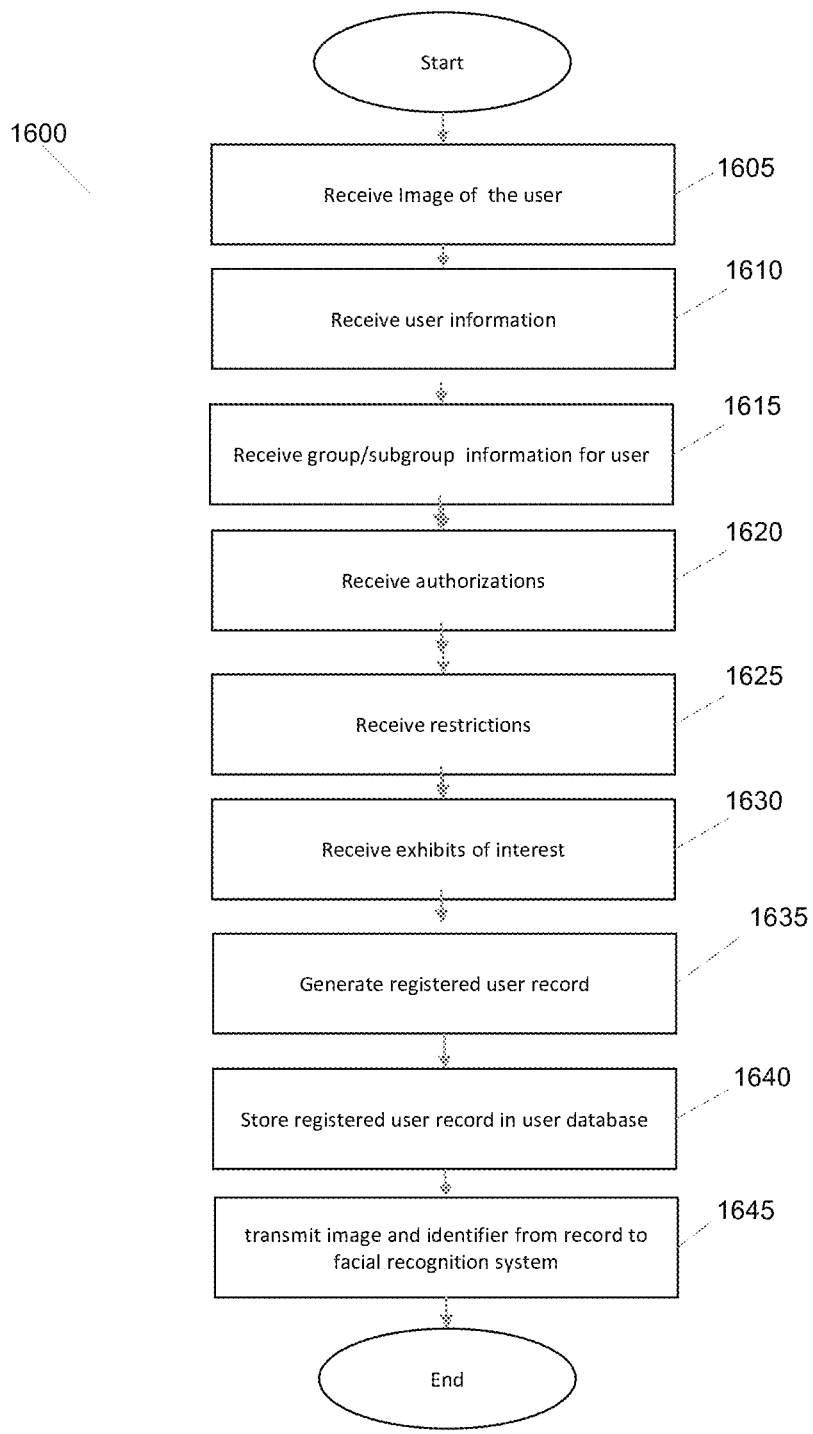
FIG. 16 is a flow diagram of a process performed by a central control system to obtain user information and generate a registered user record in accordance with an aspect of this disclosure.

FIG. 16 illustrates a flow diagram of registration process performed by a central control system or the central control system, device, or module (e.g. 104, FIG. 1) in accordance with an aspect of this disclosure. In the registration process 1600, a facial image of the user that is registering with the system is received (1605). For example, the user may provide a facial image stored on the user device that the user is using to register. In that situation, the process 1600 may issue a command (for example, by a wireless communication) that directs the user device to capture the facial image using an image capture device associated with the user device, and to provide the image to process 1600. The process 1600 may also receive user information for the user (1610). The personal information may include, but is not limited to, age, address, e-mail address, home telephone number, cellular telephone number, language, disabilities, and another special needs. In accordance with some aspects, the registering user may input the information to a personal device that provides the information to the process 1600. The process 1600 may also receive group information and subgroup information (1615) where the subgroup is a set of one or more users from the group.

The process 1600 may also receive any authorizations for the user (1620). Authorizations may include access to location information for users in a particular group and/or subgroup as well as authorization to collect and/or receive consumable items for one or more other users and access to images of one or more other users (1625). The process 1600 may also receive restrictions for the users. As discussed above, restrictions may include restrictions prohibiting attending particular exhibits and/or areas of the venue as well as restrictions for exiting the venue. The process 1600 may also receive a list of one or more exhibits of interest of the user (1630) for use in providing guidance to the user in attending the exhibits of interest. Further any other information that may include at least a portion of the information discussed above with reference to FIG. 14 may also be received by process 1600. However, the information may also include any information that may be desired.

A registered user record that includes the received user member information discussed above and the captured facial image is generated (1635) and stored in a user database (1640). The captured facial image and an identifier of the registered user is provided to the facial recognition device or model (1645), and the process 1600 may then end.

An exemplary process for registering a user in accordance with embodiments of the disclosure is described above with respect to FIG. 16. Other registration processes that add, combine, rearrange, and/or remove one or more steps described above are possible in accordance with other embodiments.

Figure 17:
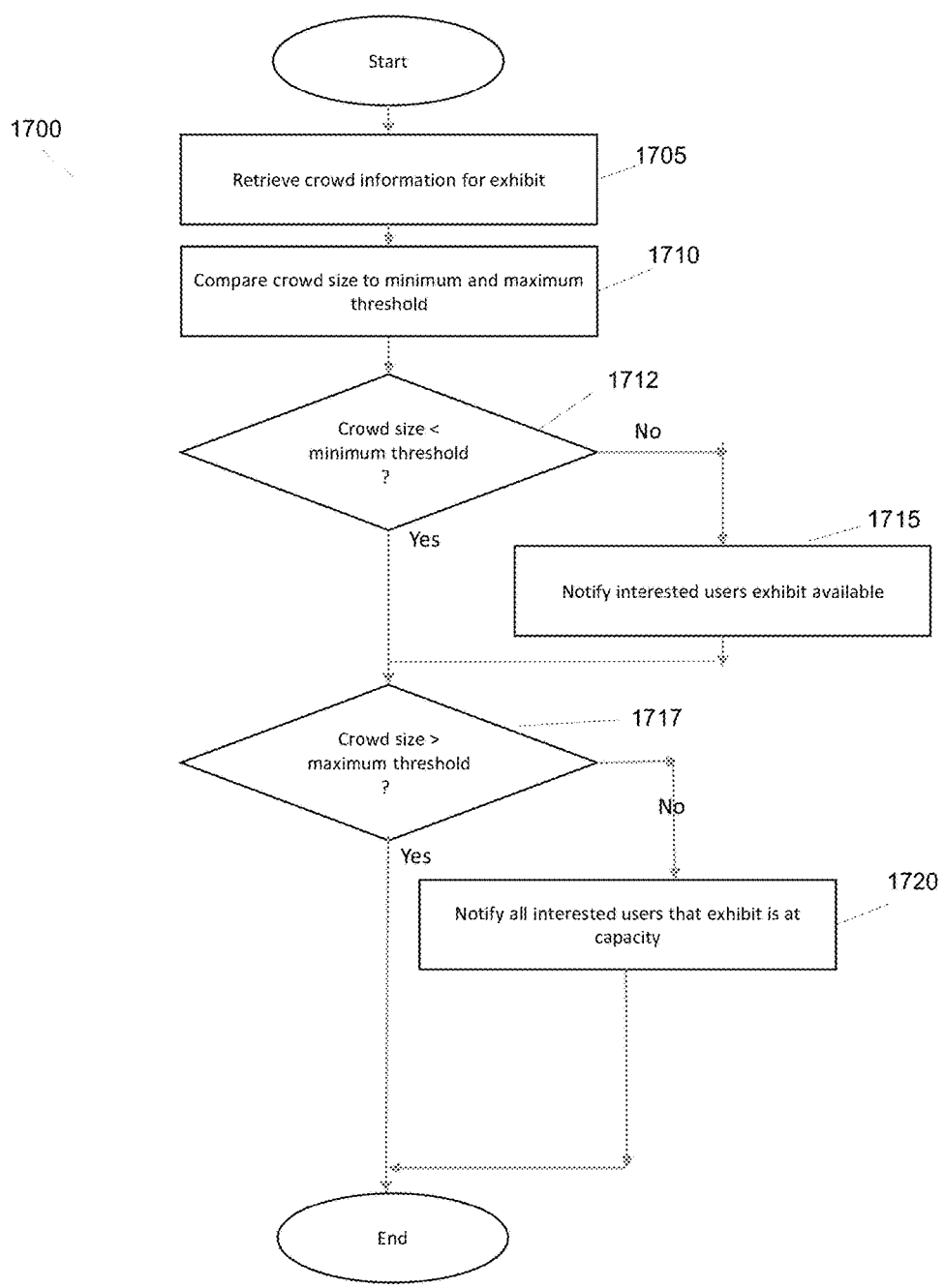
FIG. 17 is a flow diagram of a process performed by a central control system to provide crowd information to registered users in accordance with an aspect of the disclosure.

In accordance with some aspects of the disclosure, the systems and process may provide information relating to exhibits to registered users to guide the users through the venue to maximize the users enjoyment by ensure that all of the exhibits desired by the user may be visited. This may include providing a schedule or map to the user to guide the user to the venue and/or updating the schedule and/or map based on observed crowd conditions throughout the venue. In accordance with some embodiments, the system may only provide information regarding crowd information regarding particular exhibits to aid the user in determining which exhibits to visit next. A process performed by the central control system, device, or module (e.g. 104, FIG. 1) for informing registered users about crowd conditions at an exhibit and/or location in a venue is shown in FIG. 17.

A process 1700 retrieves crowd information for a particular exhibit and/or location from a location record for the particular exhibit and/or location (1705). The crowd information may be a crowd size determined from a captured image of an area near and/or in the exhibit and/or the location that was stored in the location record, as described above with respect to FIG. 14. The crowd information is compared to pre-determined minimum and maximum crowd thresholds (1710). The threshold values indicate a crowd size.

If the crowd size is less than a minimum threshold (1712), the process 1300 determines a set of the registered users interested in the exhibit and/or location and notifies the each of the registered users in the set (1715). In accordance in some embodiments, a list of interested users is maintained by the system and a predetermined number from the top of the list are notified. The registered users on the list may be removed after it is determined that the user has visited the location, for example, by using the processes described above. In some other embodiments, all of the users on list may be notified and a user is removed from list after it is determined that the user has visited the location, for example, by using the processes described above. If the crowd size is greater than or equal to a maximum threshold (1717), the interested users are notified that the exhibit and/or location is at or beyond capacity. In accordance with various aspects of this disclosure, the notifications may be sent to a hand held device via a message such as, for example, an SMS message or an e-mail message. Process 1700 then ends.

An exemplary process for notifying registered users of crowd conditions at an exhibit and/or location in accordance with embodiments of the disclosure is described above with respect to FIG. 17. Other notification processes that add, combine, rearrange, and/or remove one or more steps described above are possible in accordance with other embodiments.

Figure 18:
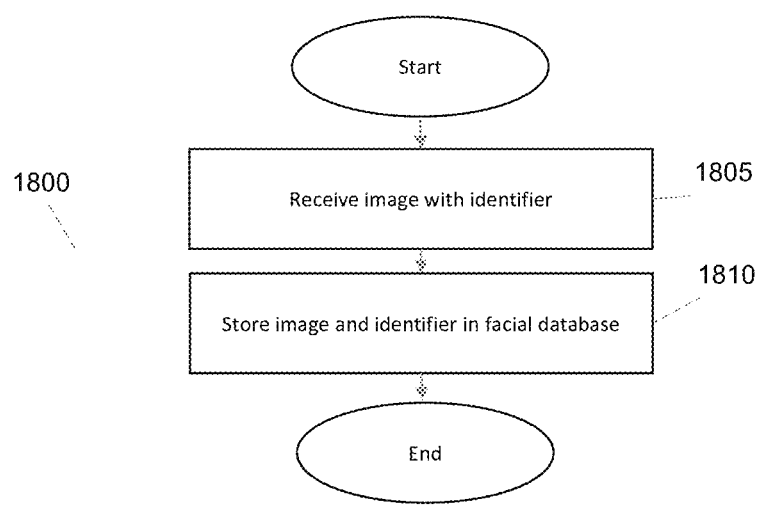
FIG. 18 is a flow diagram of a process performed by a facial recognition system to store data records of images of registered users in accordance with an aspect of the disclosure.

FIG. 18 illustrates a process performed by the facial recognition device or module (e.g. 102, FIG. 1) in response to receiving a facial image and identifier of a registered user in accordance with embodiments of this disclosure. In the process 1800, the facial recognition device or module receives a facial image and identifier of a registered user from a central control system or central control device or module (1805). A facial recognition record is generated and stored (1810). The generation of the facial recognition record may include, for example, performing analysis of the image to generate facial parameters that may be used for image comparisons during the facial recognition process, as discussed further below.

An exemplary process for obtaining facial images of registered users in a facial recognition system accordance with embodiments of the disclosure is described above with respect to FIG. 18. Other processes for obtaining facial images that add, combine, rearrange, and/or omit one or more steps described above are possible in accordance with other embodiments.

Figure 19:
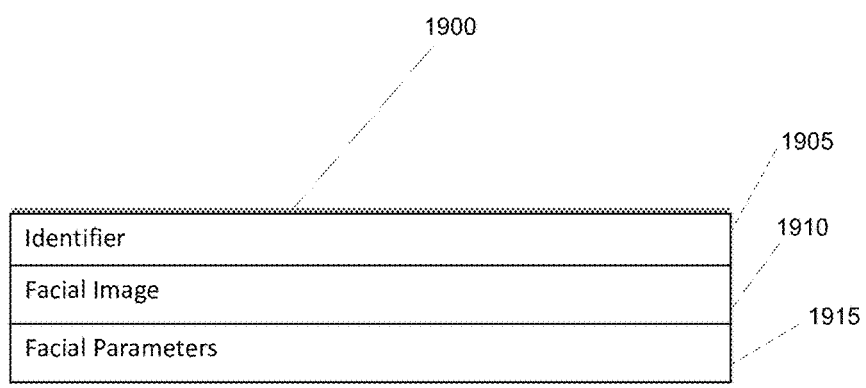
FIG. 19 is a conceptual drawing of a facial image record maintained by facial recognition system in accordance with an aspect of the disclosure.

FIG. 19 is a conceptual data structure for a facial recognition record in accordance with an aspect of the disclosure. A facial recognition record 1900 includes an identifier of the registered user 1905, the received facial image 1910, and the facial parameters for facial recognition comparisons 1915. The identifier may be, for example, a name and/or nickname of the registered user, or the identifier may be a number or alphanumeric string that associates the image to a specific registered user record stored by the central control device or module.

Although an exemplary facial recognition record in accordance with embodiments of the disclosure is described above with reference to FIG. 19, other facial recognition records that add, combine, rearrange, and/or omit information are possible in accordance with other embodiments.

Figure 20:
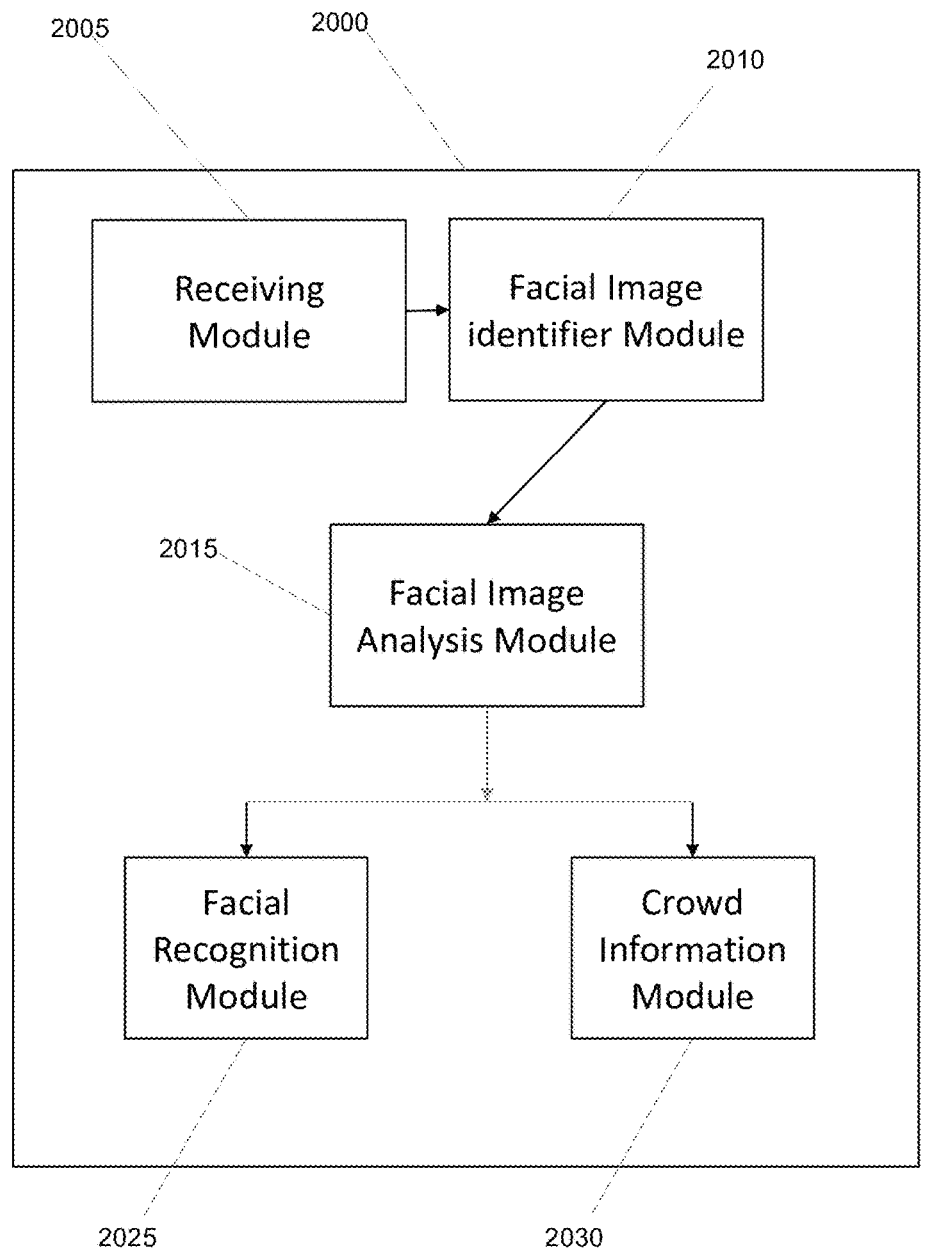
FIG. 20 is a conceptual diagram of the modules of software for performing facial recognition analysis on a captured image of a location in accordance with an aspect of the disclosure.

The software and/or hardware modules that perform a facial recognition process in accordance with embodiments of the disclosure are shown in FIG. 20. The facial recognition system 2000 includes a receiving module 2005, a facial image identifier module 2010, a facial image analysis module 2015, a facial recognition module 2025, and a crowd information module 2030.

The receiving module 2005 receives a captured image and processes the captured image to conform the image to the parameters needed to perform the various subsequent processes for facial recognition analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 1605 uses the image information in the image processing to conform the image to the required standards.

The processed image is provided to the facial image identifier module 2010, which identifies the portions of the image that include a facial image. The identification may use edge detection and other various search processes to identify those portions of the image that include an image of a face to which facial recognition may be applied. In accordance with some aspects, the facial image identifier may also perform some image processing to conform the portions including a facial image to the requirements of an analysis module.

The facial image analysis module 2015 receives the portions of the image that include a facial image and performs analysis on each portion of the image to generate the data needed by the other modules to generate the information required. For example, the image analysis module may generate pixel color and vector data needed to perform edge detection, color detection, and the like needed to perform the various subsequent processes. In accordance with some aspects, the facial image analysis module 2015 also receives the image information and/or a complete image for use in performing the analysis. The information generated by the facial image analysis module 2015 is provided to the facial recognition module 2025 and crowd information module 2030.

The facial recognition module 2025 receives the information for each facial image and compares the information of each facial image to the information for the facial images in each facial recognition record to determine a match and returns the identifier of each record that matches one of the facial images from the captured image to a predefined degree of confidence. To facilitate the comparison, the records may include facial image data that is precomputed to provide quicker comparisons by eliminating the need to analyze each reference image.

In accordance with some aspects, crowd information module 2030, receives the image information and determines the number of visitors (whether identified as a registered user or not) that are detected in the image. The crowd information module then uses the determined number of visitors to determine an estimate of the crowd size at the exhibit and/or location.

Although the above description describes modules of a facial recognition system in accordance with an exemplary embodiment of the disclosure, other facial recognition modules that that add, combine, rearrange, and/or omit modules are possible in accordance with other embodiments.

Figure 21:
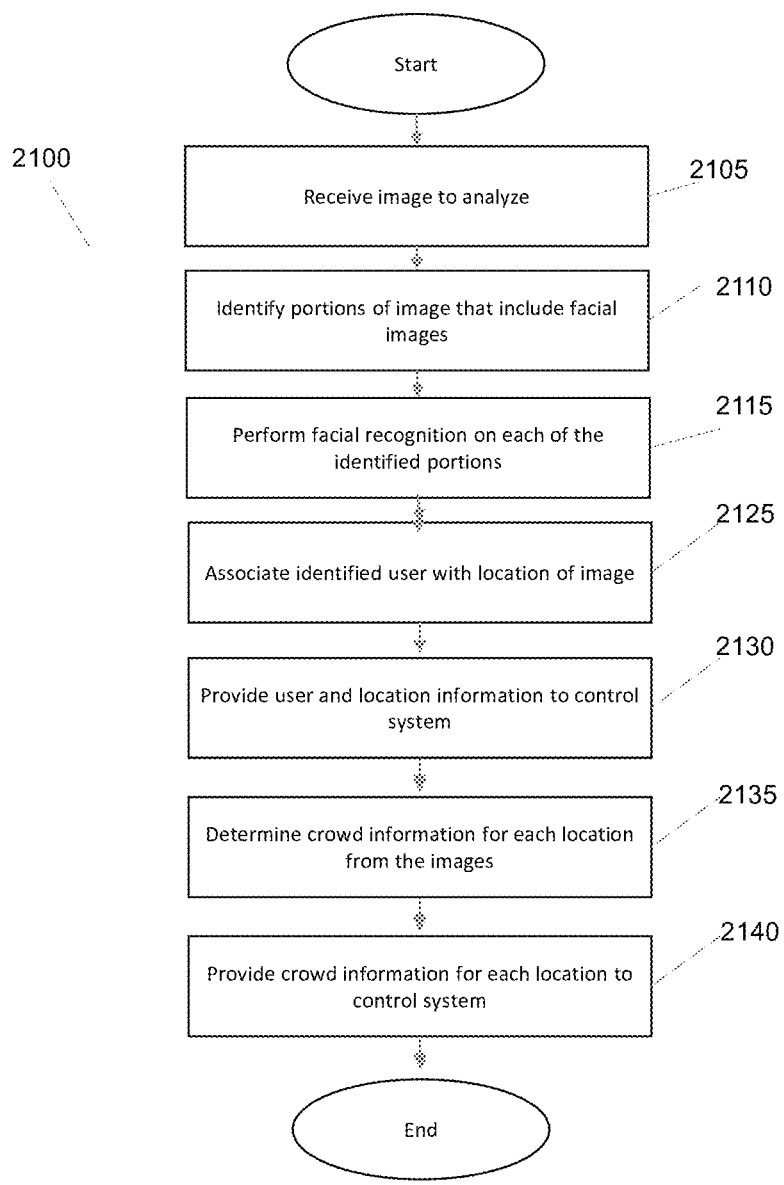
FIG. 21 is a flow diagram of a process performed by a facial recognition system to generate location information from a captured image of an area location in accordance with an aspect of the disclosure.

FIG. 21 illustrates a flow diagram of a process performed by a facial recognition system 2000 to perform facial recognition in a captured image of an area in accordance with an aspect of the disclosure. In the process 2100, an image of a known location is received (2105). As discussed above, the received image may be processed to conform the image to the requirements of the process 2100.

Portions of the received (and optionally processed) image that include a facial image are identified (2110). As discussed above, each portion may be further processed to conform the facial image to the requirements of the facial recognition process. A facial recognition comparison to the facial images stored in the facial recognition record is performed to identify the records that match the facial images (2115).

The location shown in the image is associated with each identified registered user (2125). The user and location information is then provided to the central control system (2130). Crowd information for each exhibit and/or location associated with each image is determined (2135) and the crowd information for each location is provided to the central control system, device, or module. Process 2100 may then end.

An exemplary process for determining user location information and crowd information for exhibits and/or location in a facial recognition system accordance with embodiments of the disclosure is described above with respect to FIG. 21. Other processes that add, combine, rearrange, and/or omit one or more steps described above are possible in accordance with other embodiments It is noteworthy that the flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more non-transitory machine readable medium(s) may be utilized. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory machine readable storage medium may be any tangible medium that can contain, or store a program for use by or in connection with an instruction execution system, apparatus, or device. A non-transitory machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code such as the "C" programming language, assembly language, or similar programming languages embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a non-transitory machine readable medium that can direct a machine to function in a particular manner, such that the instructions stored in the machine readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers.

After the application layer, is a cloud platform and cloud infrastructure, followed by a "server" layer that includes hardware and computer software designed for cloud specific services. The various systems described above can be a part of the server layer for using the innovative techniques described above. Details regarding these layers are not germane to the inventive aspects.

Thus, novel computing technology using facial recognition has been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

What is claimed is:

1. A system for providing location information of registered users in a venue using image processing, comprising:
a plurality of image capture devices, wherein each of the plurality of image capture devices is aimed at one of a plurality of locations in a venue to capture an image of the location;
one or more processors; and
memory in data communication with each of the one or more processors and that stores instructions that, when read by the one or more processors, direct the one or more processors to:
receive a plurality of captured images from the plurality of image capture devices, wherein each of the plurality of captured images is captured at one of the plurality of locations and is captured by one of the plurality of image capture devices;
perform processing to identify visual identifiers saved in a register record to determine each registered user identified in each of the plurality of captured images;
associate each registered user identified in each of the plurality of captured images with the location of the image in which each registered user is identified;
store the location of each of the registered users in location information of a data record maintained for each of the registered users;
receive a request for the location information of a particular registered user;
provide the location information in the data record of the particular registered user to satisfy the request;
determine a crowd size for a particular location based on the plurality of images;
compare the crowd size of the particular location to a threshold for crowd capacity of the particular location;
generate a notification of crowd size for the particular location; and
transmit the notification to a set of registered users interested in the particular location.

2. The system of claim 1, wherein the image processing performed comprises facial recognition, and wherein a visual identifier of a registered user comprises a face of the registered user.

3. The system of claim 1, further comprising:
a proximity sensor operable to detect a patron of the venue in a location, and to transmit a proximity signal in response to the detection, wherein at least one of the plurality of image capture devices associated with the location obtains an image of the location in response to receipt of the proximity signal.

4. The system of claim 1, wherein at least one of the plurality of image capture devices includes a proximity sensor operable to detect a patron of the venue in a location, and to transmit a proximity signal in response to the detection, wherein the at least one of the plurality of image capture devices associated with the location obtains an image of the location in response to receipt of the proximity signal.

5. The system of claim 2, wherein the instructions to perform facial recognition on the plurality of captured images include instructions to:
identify each portion in each of the plurality of captured images that includes a facial image; and
perform facial recognition on each portion of each of the plurality of captured images that includes a facial image to determine whether a registered user is associated with the facial image.

6. The system of claim 5, wherein the instructions to perform facial recognition on the plurality of captured images include instructions to:
obtain an identifier of each registered user associated with a portion in each of the plurality of captured images; and
add the identifier and associated location to current location information.

7. The system of claim 1, wherein the instructions further include instructions to:
receive a consumable transaction for a particular registered user wherein the request includes an identifier of consumable product obtained by the particular registered user and an identifier of the particular registered user; and
add the consumable product to consumable products that the particular registered user has obtained in the data record of the particular registered user.

8. The system of claim 7, wherein the instructions further include instructions to:
receive a request for consumable products of the particular registered user from a redemption center system;
provide each consumable product stored in the data record of the particular registered user;
receive a list of redeemed consumable products for the particular registered user from the redemption center system; and
update the data record of the particular registered user to remove consumable products on the list of redeemed consumable products.

9. The system of claim 1, wherein the instructions further include instructions to:
determine an identified registered user in one of a plurality of locations;
determine whether the identified registered user has a restriction requirement associated with the one of the plurality of locations;
determine whether the restriction requirement is met for the identified registered user in response to determining the identified registered user has the restriction requirement; and
generate a notification in response to a determination that the restriction requirement is not met.

10. The system of claim 1, wherein the instructions further include instructions to:
capture an image of a registered user at a photo opportunity area;
associate the registered user with the image from the photo opportunity area;
receive a request for each image from photo opportunity area associated with the registered user; and
provide the image from the photo opportunity area in response to the request.

11. The system of claim 1, wherein the request is a request for location information for a group of registered users that includes the particular registered user, and wherein the location information for each registered user in the group is provided to satisfy the request.

12. A method for providing location information for registered users at a venue, the method comprising:

capturing a plurality of images using a plurality of image capture devices, wherein each of the plurality of images is captured in of one of the different locations and is captured by one of the plurality of image capture devices;

performing image processing on each of the plurality of images to determine each visual identifier associated with a register record of one of a plurality of registered users identified in each of the plurality of captured images;

associating each of the plurality of registered users identified in each of the plurality of captured images with a location of the image in which each registered user is identified;

storing the location of each of the plurality of identified registered users in location information of a data record maintained for each of the plurality of identified registered users in a central control system;

receiving a request for location information of a particular registered user in the central control system from a requesting system;

providing the location information in the data record of the particular registered user to satisfy the request from the central control system;

determining a crowd size for a particular location based on the plurality of images;

comparing the crowd size of the particular location to a threshold for crowd capacity of the particular location;

generating a notification of crowd size for the particular location; and transmitting the notification to a set of registered users interested in the particular location.

13. The method of claim 12, wherein the image processing system is a facial recognition system and the visual identifier is a face, and wherein the step of performing image processing includes performing facial recognition to identify a face of each registered user in each of the plurality of images.

14. The method of claim 12, further comprising:

detecting a patron of the venue in a location using a proximity sensor; and transmitting a proximity signal from the proximity sensor to one of the plurality of image capture devices associated with the location in response to the detection, wherein the one of the plurality of image capture devices associated with the location captures an image of the location in response to the proximity signal.

15. The method of claim 12, further comprising:

obtaining an identifier of each registered user associated with a portion in each of the plurality of captured images using the image processing system; and adding the identifier and an associated location to current location information using the image processing system.

16. The method of claim 12, further comprising:

receiving a consumable transaction for a particular registered user wherein the request includes an identifier of a consumable product obtained by the particular registered user and an identifier of the particular registered user in the central control system; and adding the consumable product transaction to consumable products that the particular registered user has obtained in the data record of the particular registered user using the central control system.

17. The method of claim 14, further comprising:

receiving a request for consumable products of the particular registered user from a redemption center system in the central control system;

providing each consumable product stored in the data record of the particular registered user from the central control system to the redemption center system;

receiving a list of redeemed consumable products for the particular registered user from the redemption center system in the central control system;

updating the data record of the particular registered user to remove consumable products on the list of redeemed consumable products using the central control system.

18. The method of claim 12, wherein one of the plurality of captured images is an image of a particular location, and wherein the method further comprises:

determining an identified registered user in the image of the particular location using the central control system;

determining whether the identified registered user has a restriction requirement associated with the particular location using the central control system;

determining whether the restriction requirement is met for the identified registered user in response to determining the identified registered user has the restriction requirement using the central control system; and generating a notification in response to a determination that the restriction requirement is not met using the central control system.

19. The method of claim 12, wherein the request is a request for location information for a group of registered users that includes the particular registered user, and wherein the location information for each registered user in the group is provided to satisfy the request.

20. The method of claim 12, further comprising:

capturing an image of a register user at a photo opportunity area using an image capture device associated with the photo opportunity area;

associating the registered user with the image from the photo opportunity area using a location control system;

receiving a request for each image from photo opportunity area associated with the registered user from a redemption system in the central control system; and providing the image from the photo opportunity area in response to the request.

21. Apparatus for providing location information for a registered user in a venue, the apparatus comprising:

a processor; and memory readable by the processor that stores instructions that, when read by the processor, directs the processor to:

capture a plurality of images using a plurality of image capture devices, wherein each of the plurality of images is of one of a plurality of different locations and is captured by one of a plurality of image capture devices;

perform image processing on each of the plurality of images to determine visual identifiers of registered users identified in each of the plurality of captured images;

associate each registered user identified in each of the plurality of captured images with the location of the image in which each registered user is identified;

store the location in of each of the identified registered users in location information of a data record maintained for each of the identified registered users;

receive a request for location information of a particular registered user;

provide the location information in the data record of the particular registered user to satisfy the request;

determine a crowd size for a particular location based on the plurality of images;
compare the crowd size of the particular location to a threshold for crowd capacity of the particular location;
generate a notification of crowd size for the particular location; and
transmit the notification to a set of registered users interested in the particular location.

* * * * *